(12) United States Patent
Bekki

(10) Patent No.: US 11,655,901 B2
(45) Date of Patent: May 23, 2023

(54) GATE VALVE

(71) Applicant: WATERWORKS TECHNOLOGY DEVELOPMENT ORGANIZATION CO., LTD., Osaka (JP)

(72) Inventor: Hiroyuki Bekki, Osaka (JP)

(73) Assignee: WATERWORKS TECHNOLOGY DEVELOPMENT ORGANIZATION CO., LTD., Osaka (JP)

( * ) Notice: Subject to any disclaimer, the term of this patent is extended or adjusted under 35 U.S.C. 154(b) by 50 days.

(21) Appl. No.: 17/603,368

(22) PCT Filed: May 20, 2020

(86) PCT No.: PCT/JP2020/019944
§ 371 (c)(1),
(2) Date: Oct. 13, 2021

(87) PCT Pub. No.: WO2020/235594
PCT Pub. Date: Nov. 26, 2020

(65) Prior Publication Data
US 2022/0205546 A1      Jun. 30, 2022

(30) Foreign Application Priority Data

May 23, 2019   (JP) .............................. JP2019-097128
May 23, 2019   (JP) .............................. JP2019-097129

(51) Int. Cl.
*F16K 3/316*         (2006.01)
*F16K 3/02*          (2006.01)
(Continued)

(52) U.S. Cl.
CPC ............ *F16K 3/316* (2013.01); *F16K 3/0227* (2013.01); *F16K 27/044* (2013.01);
(Continued)

(58) Field of Classification Search
CPC .......... F16K 3/30; F16K 3/316; F16K 3/0227; F16K 27/044; F16K 3/02; F16L 21/065;
(Continued)

(56) References Cited

U.S. PATENT DOCUMENTS

| 1,805,710 | A | * | 5/1931 | Wilkins | ................ | F16L 55/105 |
| | | | | | | 277/621 |
| 3,650,547 | A | * | 3/1972 | Tickett | .................. | F16L 25/028 |
| | | | | | | 285/48 |
| 6,776,184 | B1 | * | 8/2004 | Maichel | ................ | F16L 55/105 |
| | | | | | | 251/327 |
| 8,607,814 | B1 | * | 12/2013 | Boltjes | .................. | F16L 55/105 |
| | | | | | | 83/745 |
| 8,695,626 | B2 | * | 4/2014 | Murphy | .................... | F16K 3/30 |

FOREIGN PATENT DOCUMENTS

GB        2477162 A       7/2011
JP        06-81377 A      3/1994
(Continued)

*Primary Examiner* — John Bastianelli
(74) *Attorney, Agent, or Firm* — Dilworth & Barrese, LLP

(57) ABSTRACT

Provided are a highly durable and compact gate valve and a method of installing the gate valve. The gate valve includes a valve cage 12 accommodating a valve body and a sealing band 13 covering between a pair of fluid pipes W and the valve cage 12 under a sealed state. The valve cage 12 includes a pair of protruding tubular portion 12B protruding in a pipe axis direction X from a valve cage body. The sealing band 13 includes a pair of main body portions B1 covering the respective fluid pipes W1, W2 and the protruding tubular portions 12B under a sealed state and a connecting portion B3 connecting the pair of main body portions B1 and formed unitarily therewith and is constituted of a plurality of split members Ba split in a circumferential direction of the fluid pipes W.

19 Claims, 17 Drawing Sheets

(51) Int. Cl.
*F16K 27/04* (2006.01)
*F16L 55/105* (2006.01)
*F16L 21/06* (2006.01)
*F16L 21/08* (2006.01)

(52) U.S. Cl.
CPC .............. *F16L 21/065* (2013.01); *F16L 21/08* (2013.01); *F16L 55/105* (2013.01)

(58) Field of Classification Search
CPC ..... F16L 21/08; F16L 55/105; Y10T 137/612; Y10T 137/6123
USPC ............... 251/326–329; 137/318; 138/94
See application file for complete search history.

(56) References Cited

U.S. PATENT DOCUMENTS

| | | | |
|---|---|---|---|
| 9,638,336 B2* | 5/2017 | Murphy | ............ F16L 55/105 |
| 2004/0222399 A1 | 11/2004 | Maichel | |
| 2016/0327198 A1 | 11/2016 | Sundrla | |

FOREIGN PATENT DOCUMENTS

| JP | 2003-106484 A | 4/2003 |
|---|---|---|
| JP | 2005-180523 A | 7/2005 |
| JP | 2006-515406 A | 5/2006 |
| JP | 2007-170681 A | 7/2007 |
| JP | 2009-185952 A | 8/2009 |
| JP | 2016-098920 A | 5/2016 |

* cited by examiner

GATE VALVE

TECHNICAL FIELD

The present invention relates to a gate valve including a valve body capable of closing a flow passage by being inserted between a pair of fluid pipes.

BACKGROUND ART

Conventionally, there is known a gate valve wherein a water pipe as a fluid pipe is cut by a hole saw and there is provided a valve cage (referred to as a "connecting pipe portion" in the document) accommodating a valve body between a pair of arc-shaped cut faces which approach each other as extending toward an intermediate position of the water pipe with respect to an inserting/withdrawing direction of the valve body (see Patent Document 1 for example).

The gate valve disclosed in Patent Document 1 includes a joint wheel configured to cover between the valve cage and the water pipe under a sealed state and an annular sealing member is disposed in an inner circumferential face of this joint wheel. In installing this gate valve, the joint wheel is attached to the water pipe in advance; and with the water pipe and the gate valve being surrounded by a housing under a sealed state, the joint wheel is slidably moved in the pipe axis direction by a feeder device along an outer circumferential face of the water pipe, so that the joint wheel is attached between the valve cage and the water pipe across the arc-shaped cut faces. Then, with removal of the housing, installation of the gate valve is completed.

CITATION LIST

Patent Literature

Patent Document 1: Japanese Unexamined Patent Application No. 2007-170681.

SUMMARY OF INVENTION

Technical Problem

With the gate valve disclosed in Patent Document 1, the gap between the valve cage and the water pipe is sealed by means of the joint wheel, with removal of the housing, so that the gate valve is formed compact. However, with the gate valve disclosed in Patent Document 1, since the joint wheel is moved in the pipe axis direction, in case there is present a burr or the like in the outer circumferential face of the water pipe, the annular sealing member provided in the inner circumferential face of the joint wheel can come into contact with such burr or the like, so that the function as an annular sealing member may be impaired thereby. For this reason, there was room for improvement in the respect of durability of the gate valve.

Then, there is a need for a highly durable and compact gate valve.

Solution to Problem

According to a characterizing feature of a gate valve relating to the present invention, the gate valve comprises: a valve body capable of closing a flow passage by being inserted between a pair of fluid pipes; a valve cage disposed between the pair of fluid pipes and accommodating the valve body; and a sealing band configured to cover between the pair of fluid pipes and the valve cage under a sealed state; the valve cage including a pair of protruding tubular portions protruding from a body of the valve cage in a pipe axis direction of the fluid pipes; and the sealing band including a pair of main body portions and a connecting portion connecting the pair of main body portions and formed unitarily therewith, the sealing band being constituted of a plurality of split members split in a circumferential direction of the fluid pipes, the pair of main body portions covering the respective fluid pipes and the protruding tubular portions under a sealed state, the connecting portion being opposed to a lateral face of the valve cage body extending along the pipe axis direction.

With the above-described configuration, a gate valve is comprised essentially of a valve body, a valve cage and a sealing band covering between the fluid pipes and the valve cage. Therefore, the gate valve can be formed compact without a housing for working being left therewith.

Further, the sealing band provided in the above configuration is of a unitary type consisting essentially of a pair of main body portions and a connecting portion connecting the pair of main body portions, so that this sealing band has a high strength. Moreover, since this sealing band is composed of a plurality of split members split in the circumferential direction of the fluid pipes, the plurality of split members can be attached from the radial direction of the fluid pipes. Thus, there is no need to move the sealing band along the pipe axis direction. Consequently, there is no possibility of the inner circumferential face of the sealing band being damaged by a burr or the like formed in the outer circumferential face of the fluid pipes, so that the durability of the sealing band is enhanced. As a result, it has become possible to provide a highly durable and compact gate valve.

According to a further characterizing feature of the present invention:

to an inner face of the respective main body, there is attached a sealing member extending between the fluid pipe and the protruding tubular portion; and in the sealing member, there are formed as protrusions therefrom, a first annular convex portion coming into contact with the outer circumferential face of the fluid pipe and a second annular convex portion coming into contact with an outer circumferential face of the protruding tubular portion.

With the above-described arrangement in which in the sealing member arranged in the inner face of the main body, there are formed a first annular convex portion coming into contact with the outer circumferential face of the fluid pipe and a second annular convex portion coming into contact with an outer circumferential face of the protruding tubular portion of the valve cage, fluid which may leak from between the fluid pipe and the protruding tubular portion can be blocked in a reliable manner.

According to a still further characterizing feature of the present invention:

end faces of the pair of fluid pipes comprise a pair of arc-shaped cut faces which approach each other as extending toward an intermediate position of the fluid pipes with respect to an inserting/withdrawing direction of the valve body; and at the protruding tubular portions, there are formed arc-shaped end faces opposed to each other along the arc-shaped cut faces.

With the above-described arrangement in which in the protruding tubular portions of the valve cage, there are provided arc-shaped end faces opposed to each other along the arc-shaped cut faces of the fluid pipe, it becomes possible to dispose the valve cage in close vicinity of the arc-shaped cut faces, so that the gate valve can be formed compact. Moreover, since the fluid flowing in the fluid pipes is smoothly guided by the protruding tubular portions of the valve cage, pressure loss can be decreased.

According to a still further characterizing feature of the present invention, a positioning bottom face concave portion is formed in a bottom face of the valve cage.

With the above-described arrangement in which a positioning bottom face concave portion is formed in a bottom face of the valve cage, the valve cage can be attached at an accurate position relative to the fluid pipes. As a result, reliable sealing can be provided by the sealing band between the fluid pipes and the valve case.

According to a still further characterizing feature of the present invention, the plurality of split members comprise a pair of semi-cylindrical members which are joined to each other.

With the above-described arrangement in which the split members comprise semi-cylindrical members split into halves, the split members can be easily attached from the radial direction.

According to a still further characterizing feature of the present invention, in split faces of the semi-cylindrical members, there are formed concave/convex profiles which are engageable with each other.

With the above-described arrangement in which in split faces of the semi-cylindrical members, there are formed concave/convex profiles which are engageable with each other, attachment of the split members in the radial direction can be further facilitated.

According to a still further characterizing feature of the present invention, on the side of the main body portion opposite to the valve cage, there is provided a movement preventing mechanism configured to prevent movement of the sealing band in the pipe axis direction.

With the above-described arrangement having the movement preventing mechanism, movement of the sealing band in the pipe axis direction can be prevented in a reliable manner.

According to a still further characterizing feature of the present invention, in the inner circumferential face of the main body portion, there is formed a pawl portion which bites into the fluid pipe.

With the above-described arrangement in which in the inner circumferential face of the main body portion, there is formed a pawl portion which bites into the fluid pipe, the movement of the sealing band in the pipe axis direction can be prevented reliably. Further, since this arrangement requires only provision of such pawl portion in the main body portion, the number of components can be reduced.

According to a still further characterizing feature of the present invention, an annular concave portion is formed in the outer circumferential face of the fluid pipe and an annular convex portion engageable with the annular concave portion is formed in the inner circumferential face of the main body portion.

With the above-described arrangement in which an annular concave portion of the fluid pipe is engaged with an annular convex portion of the main body portion, movement of the sealing band in the pipe axis direction can be prevented in a reliable manner. Moreover, as this arrangement requires only provision of such annular concave portion in the fluid pipe and such annular convex portion in the main body portion, the number of components can be reduced.

According to a characterizing feature of a method of installing a gate valve relating to the present invention, there is provided a method of installing a gate valve to a fluid pipe, the gate valve comprising a valve body capable of closing a flow passage by being inserted between a pair of fluid pipes, a valve cage accommodating the valve body and a sealing band comprised of a unitary component including a pair of main body portions and a connecting portion connecting the pair of main body portions and formed unitarily therewith, the unitary component comprising a pair of semi-cylindrical members joined to each other, the method comprising: a housing attaching step attaching a housing accommodating the sealing band to the fluid pipe under a sealed state; a fluid pipe cutting step cutting the fluid pipe inside the housing to form a pair of arc-shaped cut faces which approach each other as extending toward an intermediate portion of the fluid pipe; a valve cage installing step inserting the valve cage accommodating the valve body between the pair of arc-shaped cut faces inside the housing; a sealing band attaching step moving the semi-cylindrical members in a radial direction of the fluid pipe by operating an operational portion provided outside the housing so as to cover between the fluid pipes and the valve cage with the sealing band under a sealed state; and a housing removing step removing the housing from the fluid pipes.

In the above-described method, the sealing band is accommodated in the housing in advance. Then, by operating an operational portion provided outside the housing, the pair of semi-cylindrical members are moved to arrange the sealing band between the fluid pipes and the valve cage. Then, the housing is removed from the fluid pipes, whereby attachment of the gate valve is completed. In this way, as the gate valve is constituted of the sealing band which covers between the fluid pipes and the valve case under a sealed state, it is possible to form the gate valve compact, without the housing being left thereon.

Further, with this method, since the pair of semi-cylindrical members are attached from the radial direction, there is no need to move the sealing band along the pipe axis direction. Consequently, the inner circumferential face of the sealing band will not be damaged by a burr or the like formed on the outer circumferential faces of the fluid pipes, so the durability of the sealing band can be enhanced. As a result, it has become possible to provide a method of installing a highly durable compact gate valve.

According to a further characterizing feature of the inventive method, at the sealing band attaching step, the semi-cylindrical members are slidably moved as being guided by a holding portion provided in a bottom portion of the housing and holding the semi-circular cylindrical portions.

With the above method, as the lateral movements of the pair of semi-circular cylindrical portions are guided by a holding portion provided in a bottom portion of the housing, the attaching positions of the pair of semi-cylindrical members relative to the fluid pipes and the valve cage can be made more accurate. As a result, even more reliable sealing can be provided by the sealing band between the fluid pipes and the valve cage.

According to a characterizing feature of a gate valve relating to the present invention, the gate valve comprises: a valve body capable of closing a flow passage by being inserted between a pair of fluid pipes; a valve cage disposed between the pair of fluid pipes and accommodating the valve body; and a sealing band configured to cover between the pair of fluid pipes and the valve cage under a sealed state; the sealing band being comprised of a pair of annular split bodies split by a plane perpendicular to a pipe axis direction in such a manner as to cover the pair of fluid pipes and opposed end portions of the valve cage opposed to end faces of the respective fluid pipes; and each annular split body including a main body portion and an engaging portion and being constituted of a plurality of split members split in a circumferential direction of the fluid pipe, the main body portion covering the fluid pipe and the valve cage under a sealed state, the engaging portion being engageable with an engaged portion of the valve cage.

With the above-described configuration, a gate valve is constituted of a valve body, a valve cage and a sealing band configured to cover between the pair of fluid pipes and the valve cage under a sealed state. Therefore, it is possible to form the gate valve compact, without a housing for working remaining thereon.

Further, in the above configuration, the annular sealing body is comprised of a plurality of split members split in a circumferential direction of the fluid pipe and includes an engaging portion engageable with an engaged portion of the valve cage. Namely, it becomes possible to attach the plurality of split members from the radial direction of the fluid pipe with engagement between the engaged portion and the engaging portion. Thus, there is no need to move the sealing band along the pipe axis direction. Consequently, there is no possibility of the inner circumferential face of the sealing band being damaged by a burr or the like formed in the outer circumferential face of the fluid pipes, so that the durability of the sealing band is enhanced. As a result, it has become possible to provide a highly durable and compact gate valve.

According to a further characterizing feature of the invention: in the valve cage, as the engaged portion, there is formed a protrusion protruding from a lateral face along the pipe axis direction to the outer side; the annular split body includes an extension portion extending from the main body portion to oppose to the lateral face; and at a leading end portion of the extension portion, the engaging portion is formed.

In the above-described arrangement, the engaged portion is formed as a protrusion protruding from a lateral face of the valve cage and the engaging portion is formed at the leading end portion of the extension portion of the annular split body. With this, the device configuration can be made simple. Moreover, with provision of the extension portion in the annular split body extending from the main body portion, the strength of the sealing band can be increased.

According to a still further characterizing feature of the invention in the protrusion, there is formed an inclined face whose width in the pipe axis direction progressively increases toward the lateral face; and in the engaging portion, there is formed an opposing inclined face opposed to the inclined face.

With the above-described arrangement in which an inclined face is provided in the protrusion of the valve cage and an opposing inclined face is provided in the engaging portion, attachment of the annular split body to the valve cage is guided by the inclined face and the opposing inclined face. As a result, the operation of attaching the annular split body to the valve cage is facilitated.

According to a still further characterizing feature: the valve cage includes a pair of protruding tubular portions protruding from the valve cage body in the pipe axis direction; in an inner face of the main boy portion, there is attached a sealing member extending between the fluid pipe and the protruding tubular portion; and in the sealing member, there are formed, as protrusions therefrom, a first annular convex portion coming into contact with the outer circumferential face of the fluid pipe and a second annular convex portion coming into contact with the outer circumferential face of the protruding tubular portion.

With the above-described arrangement in which in the sealing member arranged on the inner circumferential face of the main body portion of the annular split body, there are provided a first annular convex portion coming into contact with the outer circumferential face of the valve cage and a second annular convex portion coming into contact with the outer circumferential face of the protruding tubular portion of the valve cage, fluid which may leak from between the fluid pipe and the protruding tubular portion can be blocked in reliable manner.

According to a further characterizing feature: the pair of end faces comprise a pair of arc-shaped cut faces which approach each other as extending toward an intermediate position of the fluid pipes with respect to an inserting/ withdrawing direction of the valve body; and in the annular tubular portion, there is formed an opposing arc-shaped end face along the arc-shaped cut face.

With the above-described arrangement in which an arc-shaped end face opposed to the arc-shaped cut face of the fluid pipe is provided in the protruding tubular portion of the valve cage, it becomes possible to dispose the valve cage in close vicinity of the arc-shaped cut faces, so that the gate valve can be formed compact. Moreover, since the fluid flowing in the fluid pipes is smoothly guided by the protruding tubular portions of the valve cage, pressure loss can be decreased.

According to a still further characterizing feature of the present invention, a positioning bottom face concave portion is formed in a bottom face of the valve cage.

With the above-described arrangement in which a positioning bottom face concave portion is formed in a bottom face of the valve cage, the valve cage can be attached at an accurate position relative to the fluid pipes. As a result, reliable sealing can be provided by the sealing band between the fluid pipes and the valve case.

According to a still further characterizing feature of the present invention, each one of the plurality of split members comprises a pair of semi-cylindrical members which are joined to each other.

With the above-described arrangement in which the split members comprise semi-cylindrical members split into halves, the split members can be easily attached from the radial direction.

According to a still further characterizing feature of the present invention, in split faces of the semi-cylindrical members, there are formed concave/convex profiles which are engageable with each other.

With the above-described arrangement in which in split faces of the semi-cylindrical members, there are formed concave/convex profiles which are engageable with each other, attachment of the split members in the radial direction can be further facilitated.

According to a still further characterizing feature of the present invention, end portions of the pair of semi-cylindrical members are joined to each other via a hinge.

With the above-described arrangement in which end portions of the pair of semi-cylindrical members are joined to each other via a hinge, the semi-cylindrical members which opened apart from each other will be attached to the fluid pipes or the valve cage in advance. Then, these semi-cylindrical members will be closed with the valve cage being arranged between the pair of fluid pipes, whereby attachment of the sealing band is completed. Therefore, operational readiness is increased.

According to a still further characterizing feature of the present invention, on the side of the main body portion opposite to the valve case, there is provided a movement preventing mechanism configured to prevent movement of the sealing band in the pipe axis direction.

With the above-described arrangement having the movement preventing mechanism, movement of the sealing band in the pipe axis direction can be prevented in a reliable manner.

According to a still further characterizing feature of the present invention, in the inner circumferential face of the main body portion, there is formed a pawl portion which bites into the fluid pipe.

With the above-described arrangement in which in the inner circumferential face of the main body portion, there is formed a pawl portion which bites into the fluid pipe, the movement of the sealing band in the pipe axis direction can be prevented reliably. Further, since this arrangement requires only provision of such pawl portion in the main body portion, the number of components can be reduced.

According to a still further characterizing feature of the present invention, an annular concave portion is formed in the outer circumferential face of the fluid pipe and an annular convex portion engageable with the annular concave portion is formed in the inner circumferential face of the annular split body.

With the above-described arrangement in which an annular concave portion of the fluid pipe is engaged with an annular convex portion of the annular split body, movement of the sealing band in the pipe axis direction can be prevented in a reliable manner. Moreover, as this arrangement requires only provision of such annular concave portion in the fluid pipe and such annular convex portion in the annular split body, the number of components can be reduced.

According to a characterizing feature of a method of installing a gate valve relating to the present invention, there is provided a method of installing a gate valve to a fluid pipe, the gate valve comprising a valve body capable of closing a flow passage by being inserted between a pair of fluid pipes, a valve cage accommodating the valve body and a sealing band comprised of a pair of annular split bodies split in a circumferential direction of the fluid pipe, the annular split body being formed of a plurality of split members split in the pipe axis direction of the fluid pipes, the method comprising: a housing attaching step attaching a housing accommodating the sealing band to the fluid pipe under a sealed state; a fluid pipe cutting step cutting the fluid pipe to form a pair of arc-shaped cut faces which approach each other as extending toward an intermediate portion of the fluid pipe; a valve cage installing step inserting the valve cage accommodating the valve body between the pair of arc-shaped cut faces inside the housing; a sealing band attaching step moving the split members in a radial direction of the fluid pipe by operating an operational portion provided outside the housing so as to cover between the fluid pipe and the valve cage with the sealing band under a sealed state; and a housing removing step removing the housing from the fluid pipes.

In the above-described method, the sealing band is accommodated in the housing in advance. Then, by operating an operational portion provided outside the housing, the split members are moved to arrange the sealing band between the fluid pipe and the valve cage and then the housing is removed from the fluid pipes, whereby the attachment of the gate valve is completed. As described above, as the gate valve is constituted of the valve body, the valve cage and the sealing band which covers between the fluid pipes and the valve cage under a sealed state, it is possible to form the gate valve compact, without the housing being left thereon.

Further, with this method, since the plurality of split members are attached from the radial direction, there is no need to move the sealing band along the pipe axis direction. Consequently, the inner circumferential face of the sealing band will not be damaged by a burr or the like formed on the outer circumferential faces of the fluid pipes, so the durability of the sealing band can be enhanced. As a result, it has become possible to provide a method of installing a highly durable compact gate valve.

According to a further characterizing feature of the inventive method, at the sealing band attaching step, the split members are slidably moved as being guided by a holding portion provided in a bottom portion of the housing and holding the semi-circular cylindrical portions.

With the present method, as the lateral movements of the split members are guided by a holding portion provided in a bottom portion of the housing, the attaching positions of the split members relative to the fluid pipes and the valve cage can be made more accurate. As a result, more reliable sealing can be provided by the sealing band between the fluid pipes and the valve cage.

DESCRIPTION OF EMBODIMENTS

Next, embodiments of a gate valve and a method of installing a gate valve relating to the present invention will be explained with reference to the accompanying drawings. In these embodiments, as an example of a gate valve, there will be explained a gate valve 1 to be installed in a water pipe W (an example of a "fluid pipe"). It is understood, however, that the invention is not limited to these embodiments, but various modifications thereof are possible within a range not deviating essence thereof. In the following, the direction of gravity may sometimes be referred to as the lower direction, and the opposite direction to the gravity direction may sometimes be referred to as the upper direction.

First Embodiment

Figure 1:
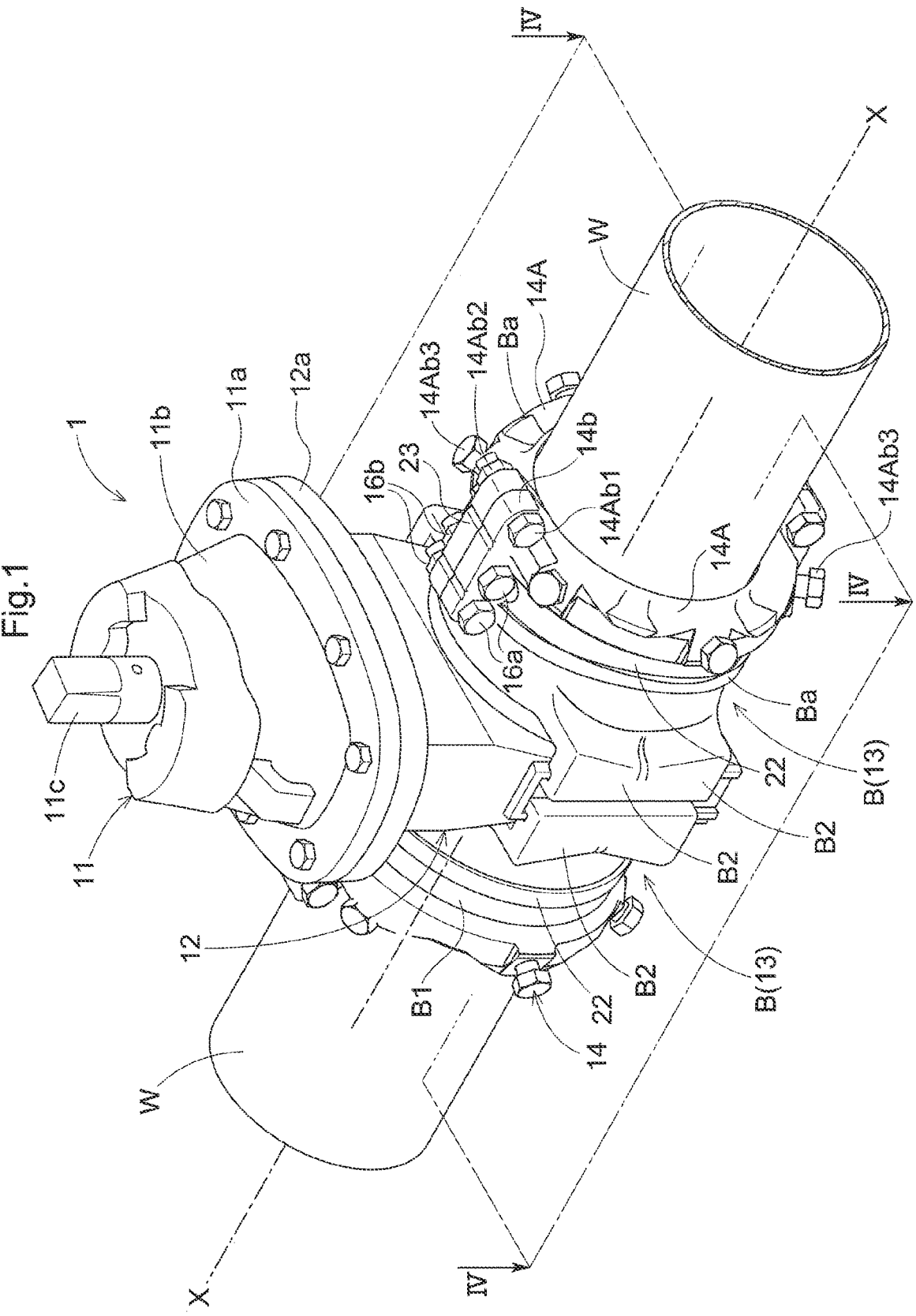
FIG. 1 is a perspective view showing a gate valve according to a first embodiment.
Figure 2:
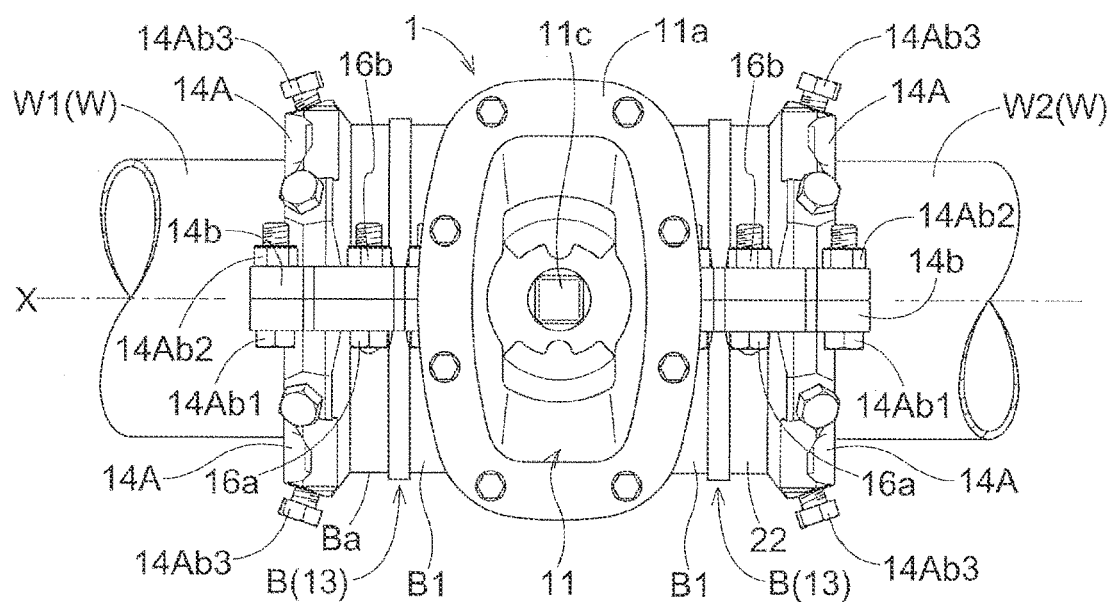
FIG. 2 is a plan view of the gate valve according to the first embodiment.
Figure 3:
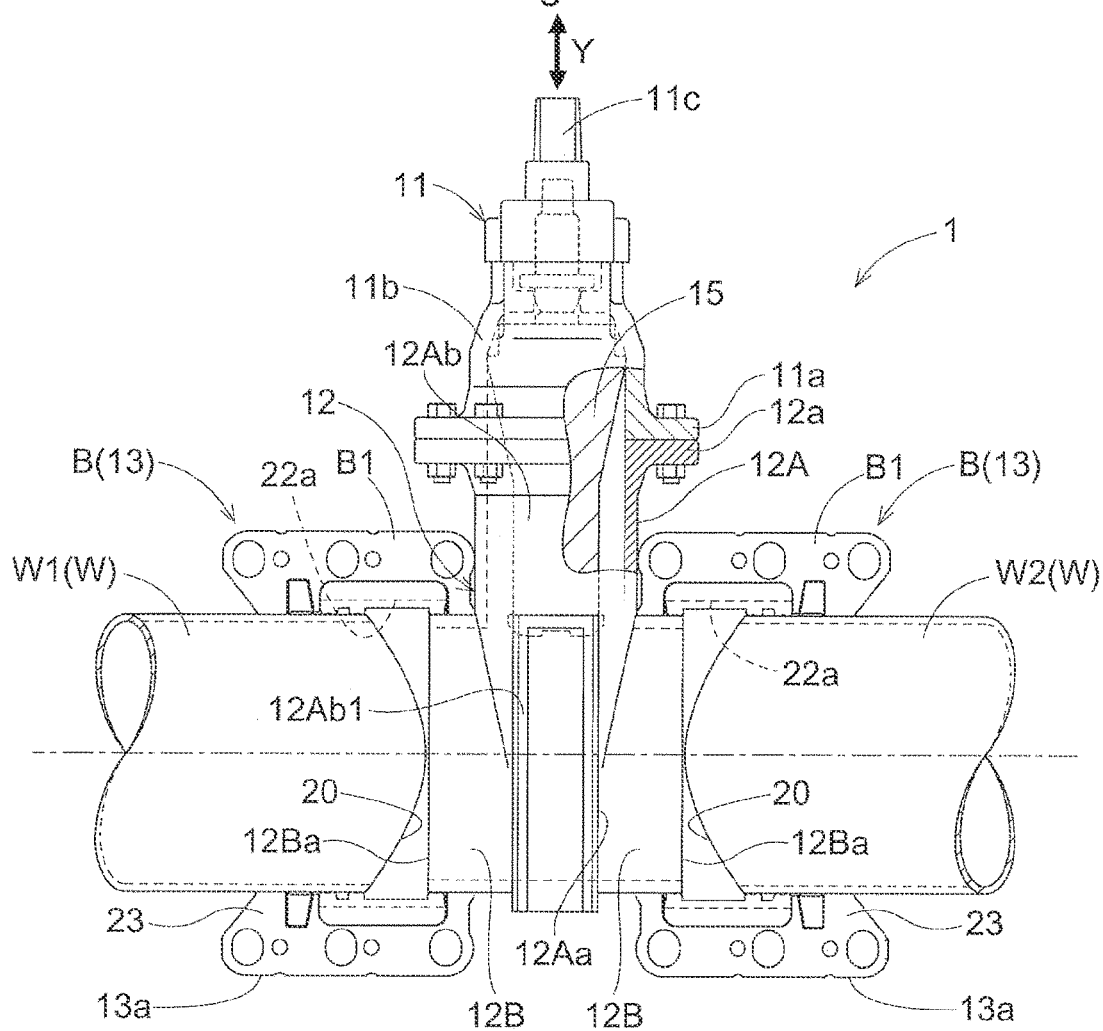
FIG. 3 is a side view showing a state in which one split member has been removed.

As shown in FIGS. 1-4, the gate valve 1 includes a bonnet 11, a valve cage 12, a sealing band 13 and a movement preventing mechanism 14. Further, as shown in FIG. 3, the gate valve 1 includes a valve body 15 accommodated in the valve cage 12.

As shown in FIGS. 1-3, the bonnet 11 includes a bonnet flange 11a to be fastened to a valve cage flange 12a of the valve cage 12 with bolts, nuts, a bonnet side accommodating portion 11b accommodating the valve body 15 under its opened state, and an operated portion 11c provided at an upper portion of the bonnet side accommodating portion 11b and rotatably operated with use of an unillustrated operational tool. In the bonnet 11, there is provided a straight moving mechanism for causing a straight movement of the valve body 15 in association with a rotational operation of the operated portion 11c. This straight moving mechanism is configured to cause a straight movement of the valve body 15 by either a straight movement of the valve body 15 to close a water pipe W or a reverse movement of the valve body 15 to open the water pipe W.

Figure 4:
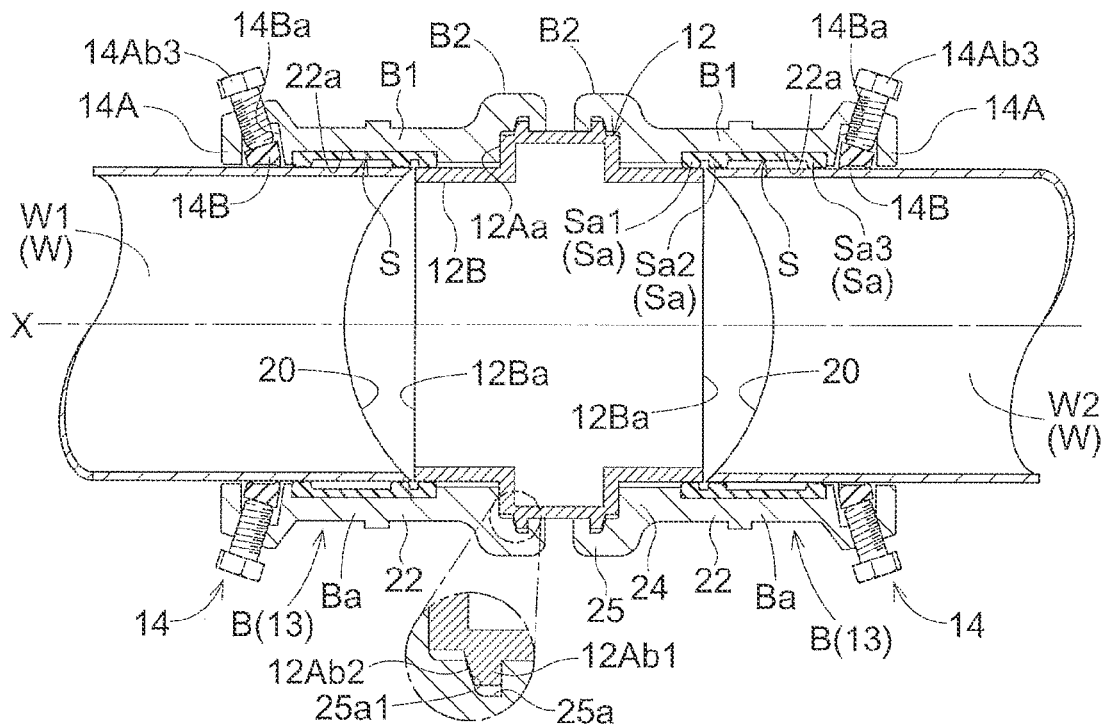
FIG. 4 is a section view taken along IV-IV line in FIG. 1.

As shown in FIG. 3 and FIG. 4, the valve cage 12 is inserted between arc-shaped cut faces 20 of a pair of water pipes W1, W2 formed by cutting the water pipe W. The valve cage 12 includes a valve cage side accommodating portion 12A (an example of a "valve cage body") accommodating the valve body 15 and a pair of protruding tubular portions 12B protruding from a pair of crossing faces 12Aa forming a plane which crosses a pipe axis direction X (to be referred to as a "pipe axis direction X" hereinafter) along this pipe axis direction X of the water pipe W toward the water pipes W1, W2.

Figure 5:
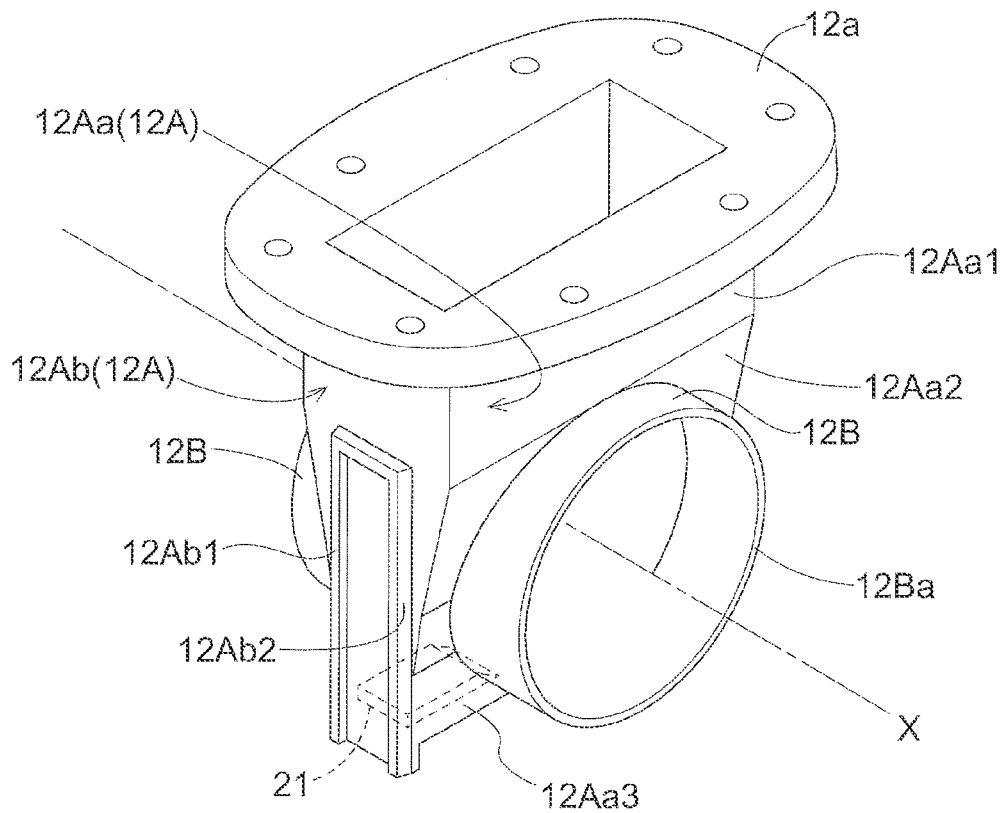
FIG. 5 is a perspective view of a valve cage.

As shown in FIG. 5, the valve cage side accommodating portion 12A is formed in a box-like shape having the pair of crossing faces 12Aa forming the plane crossing the pipe axis direction X and a pair of lateral faces 12Ab forming a plane along the pipe axis direction X. The pair of crossing faces 12Aa are constituted of a pair of base end faces 12Aa1 provided on the side of the bonnet 11 and having a fixed width in the pipe axis direction X, a pair of tapered faces 12Aa2 whose width in the pipe axis direction X progressively decreases toward the leading end side (lower direction) than their portions joined with the base end faces 12Aa1 and a pair of leading end faces 12Aa3 perpendicular to the pipe axis direction X in a region from their portions joined with the tapered faces 12Aa2 to the leading ends. Further, on the inner side adjacent the joining portion of each leading end portion 12Aa3 joining with the tapered face 12Aa2, there is formed a reinforcing plate 21 for joining each leading end face 12Aa3. The pair of lateral faces 12Ab form a U-shaped protrusion 12Ab1 (an example of an "engaged portion") protruding to the outer side. At a pair of outer ends of this protrusion 12Ab1, there are formed inclined faces 12Ab2 whose width in the pipe axis direction X progressively increases toward the lateral face 12Ab (toward the center of the water pipe W).

Figure 6:
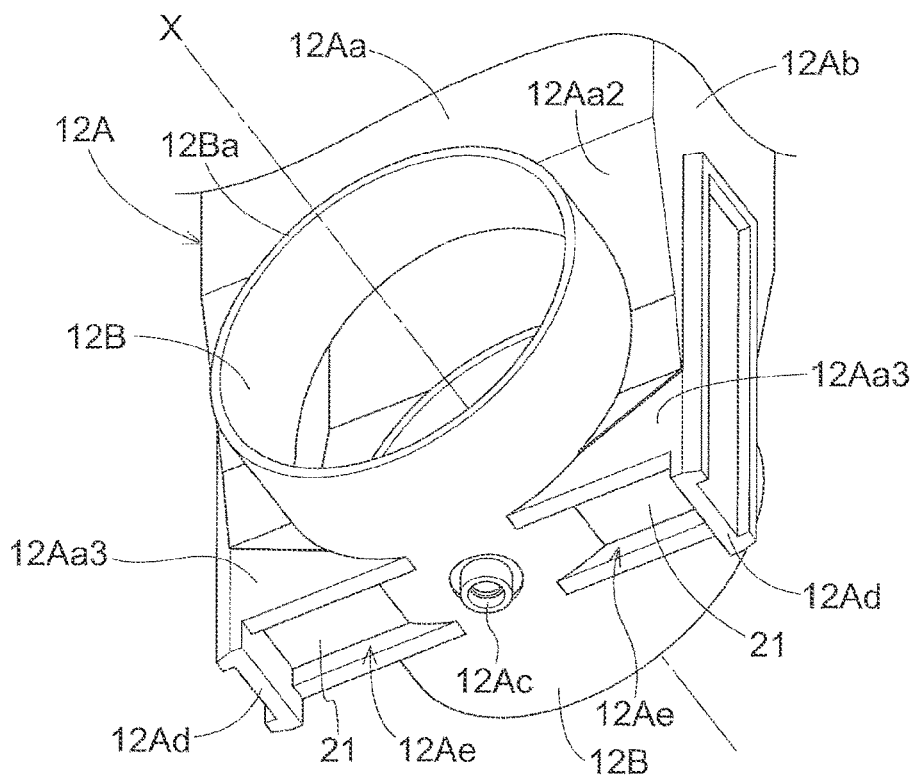
FIG. 6 is a perspective view showing the valve cage as seen from its bottom face side.
Figure 7:
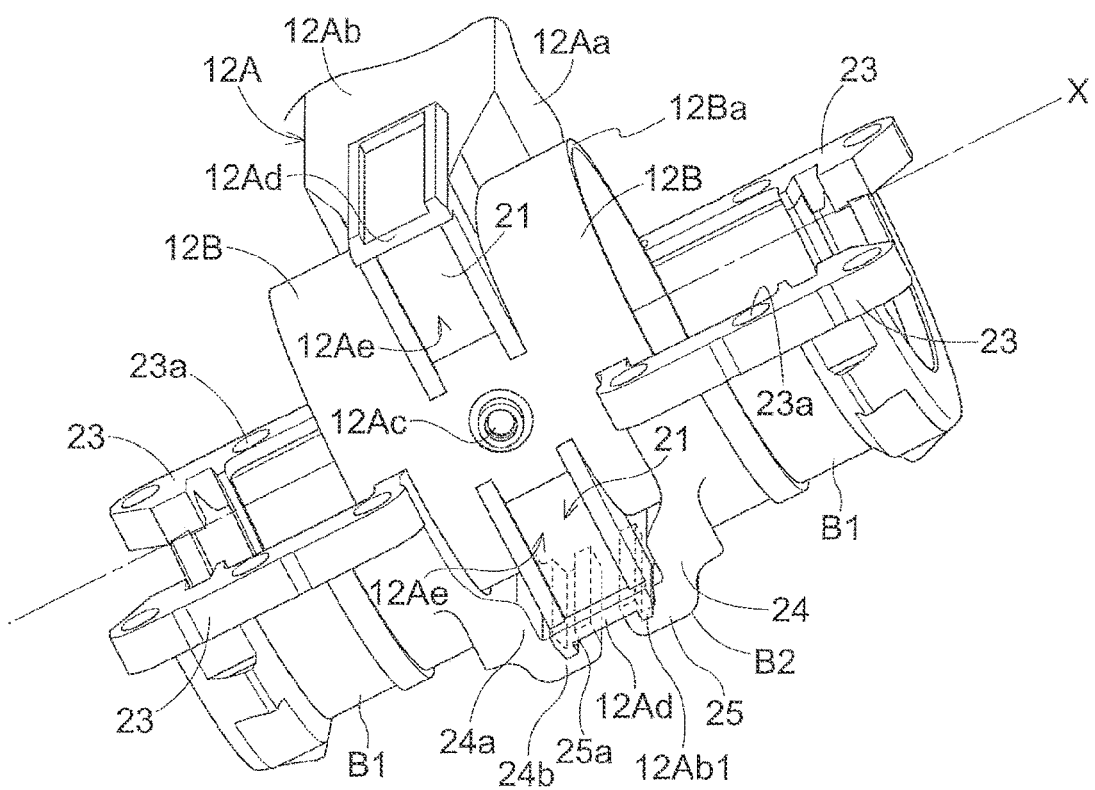
FIG. 7 is a perspective view showing a state in which a sealing band has been attached, as seen from the bottom face side.

As shown in FIG. 6 and FIG. 7, in the bottom face of the valve cage side accommodating portion 12A, there are formed a bottom face concave portion 12Ac for positioning formed at the center and a pair of supporting leg portions 12Ad acting as mounting portions at the time of transport. Further, in areas surrounded by the pair of supporting leg portions 12Ad, the bottom face concave portion 12Ac and the pair of leading end faces 12Aa3, there are formed "material-removed" portions 12Ae as spaces.

Each protruding tubular portion 12B is provided in the form of a cylinder having the same diameter as the water pipe W and in the respective protruding tubular portions 12B, there are formed flat end faces 12Ba opposed to the arc-shaped cut faces 20 of the pair of water pipes W1, W2. Though will be explained in details later herein, in the water pipe W cut by a rotating hole saw, there are formed the pair of arc-shaped cut faces 20 having arcuate shape as seen in a side view which approach each other toward an intermediate position as seen in the side view of the water pipe W relative to an inserting/withdrawing direction Y of the valve body 15 (see FIG. 3).

As shown in FIG. 4, the sealing band 13 covers between the pair of water pipes W1, W2 and the valve cage 12. The sealing band 13 is constituted of a pair of annular split bodies B split in the plane perpendicular to the pipe axis direction X so as to cover the arc-shaped cut faces 20 (water pipe W) of the pair of water pipes W1, W2 and the pair of flat end faces 12Ba (opposed ends of the valve cage 12) opposed to the respective arc-shaped cut faces 20, individually. As shown in FIGS. 1 through 4, each annular split body B is constituted of a pair of split members Ba split further in the circumferential direction of the water pipe W, and each split member Ba is constituted of a pair of semi-cylindrical members (an example of "a plurality of split members") which are to be joined to each other. The respective split members Ba have an identical shape, so that one split member Ba is joined to the other split member Ba, with the former being rotated by 180 degrees about the pipe axis direction X.

The annular split body B formed of the pair of split members Ba joined to each other includes a main body portion B1 which covers the water pipe W and the valve cage 12 under a sealed state and an extension portion B2 extending from the main body portion B1 to be opposed to the lateral face 12Ab of the valve cage 12 (see also FIG. 7).

The main body portion B1 includes an annular portion 22 and a pair of joining portions 23 protruding to the outer sides from the opposed ends of the annular portion 22 to join the pair of split members Ba with fastening bolts 16a and fastening nuts 16b (see FIG. 1 and FIG. 2).

Figure 8:
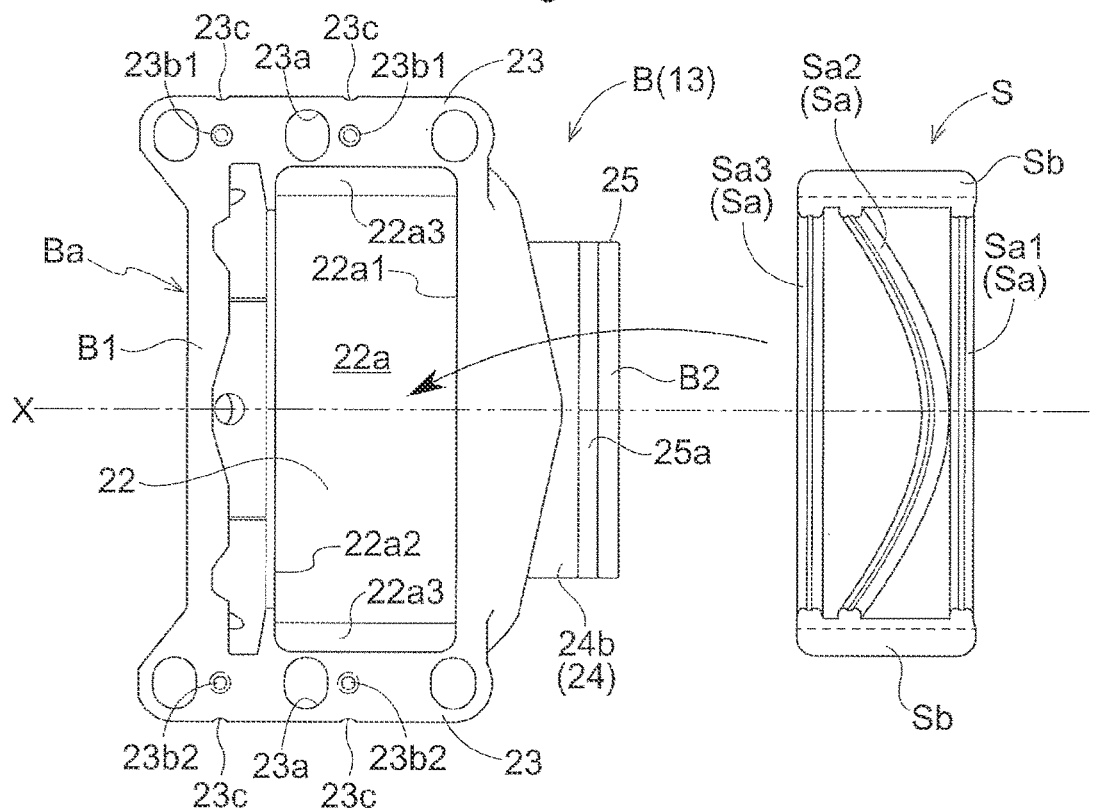
FIG. 8 is a view showing a state in which a sealing member is to be attached to one split member.

As shown in FIG. 8, in the inner face of the annular portion 22, there is formed a sealing groove 22a to which the sealing member S is to be fitted. In this sealing groove 22a, there are formed a first flat wall portion 22a1 perpendicular to the pipe axis direction X on the side opposed to the outer circumferential face of the protruding tubular portion 12B of the valve cage 12 and a second flat wall portion 22a2 perpendicular to the pipe axis direction X on the side opposed to the water pipe W. Further, in the split faces of the pair of split members Ba (semi-circular tubular members), there are formed engaging grooves 22a3 engageable with engaging leg portions Sb of the sealing member S to be described later.

The sealing member S includes a gapless contact portion Sa which comes into gapless contact with the outer circumferential faces of the opposed portions of the water pipe W and the protruding tubular portion 12B of the valve cage 12 and the engaging leg portions Sb protruding outwards from the gapless contact portion Sa to be engaged with the engaging grooves 22a3 of the sealing groove 22a (see FIG. 4 and FIG. 8). In the gapless contact portion Sa, there are formed, as protrusions, a first annular convex portion Sa1 which comes into contact with the outer circumferential face of the protruding tubular portion 12B of the valve cage 12 and having a straight linear shape as seen the side view and two second annular convex portions Sa2, Sa3 which come into contact with the outer circumferential face of the water pipe W. One annular convex portion Sat provided on the side of the valve cage 12 of the two second annular convex portions Sa2, Sa3 has an arc shape as seen in the side view to extend along the arc-shaped cut face 20 of the water pipe W, whereas the other second annular convex portion Sa3 provided on the side of a movement preventing mechanism 14 has a straight linear shape as seen in the side view. As described above, in the sealing member S disposed in the inner face of the main body portion B1 of the annular split body B, there are provided the first annular convex portion Sa1 which comes into contact with the outer circumferential face of the protruding tubular portion 12B of the valve cage 12 and the two second annular convex portions Sa2, Sa3 which come into contact with the outer circumferential face of the water pipe W. With this, leakage of water from between the water pipe W and the protruding tubular portion 12B can be prevented in a reliable manner. Incidentally, either one of the second annular convex portions Sa2, Sa3 may be omitted.

As shown in FIG. 4, at the outer end of the annular portions 22 of the annular split body B, there is integrally formed the movement preventing mechanism 14. The movement preventing mechanism 14 is located on the side opposite to the valve cage 12 and prevents movement of the annular split body B in the pipe axis direction X. This movement preventing mechanism 14 includes a pair of halved split pressing bodies 14A formed integral with the annular portion 22 and a plurality of (six in this embodiment) retaining members 14B which can bite into the outer circumferential face of the water pipe W (see FIGS. 1 and 2 also). Between the joining portions 23 formed at the circumferential end portions of the pair of split pressing bodies 14A, there are provided a fastening bolt 14ab1 and a fastening nut 14Ab2 which join the pair of split pressing bodies 14A to each other. Further, between the fastening bolt 14Ab1 and the fastening nut 14Ab2 of the split pressing bodies 14A, a plurality of (six in this embodiment) pressing bolts 14Ab3 are inserted. The retaining members 14B are attached to be movable within concave accommodating portions 14ba formed at a plurality of positions in the circumferential direction of the inner circumferential face of the split pressing bodies 14A. In association with fastening operations of the pressing bolts 14Ab3, each retaining member 14b is moved to the radially inner side to bite into the outer circumferential face of the water pipe W.

As shown in FIG. 1 and FIG. 2, the pair of joining portions 23 are formed at positions on the side opposite to the extension portions B2 so as not to interfere with the annular side walls 22b and are fastened by a plurality of (two for each annular split body B) fastener bolts 16a and the fastener nuts 16b. Further, as shown in FIG. 8, in one split face of the joining portion 23, there are formed a plurality of (two in this embodiment) convex portions 23b1 and in the other split face thereof, there are formed a plurality of (two in this embodiment) concave portions 23b2. In this way, with the convex portions 23b1 and the concave portions 23b2 of the joining portion 23, there are formed concave/convex profiles which engage with each other in the split faces of the pair of split members Ba (semi-cylindrical members). Further, in the outer lateral face of the joining portion 23, there are formed a plurality of (two provided at positions adjacent the convex portion 23b1 and the concave portion 23b2) engaging grooves 23c in the form of recesses engageable with protrusions 33A of the holding portion 33 provided in the housing 3 (the bottom wall 3Ab of the lower case 3A) to be described later.

As shown in FIG. 7 and FIG. 8, the extension portion B2 includes a base end portion 24 connected to the annular portion 22 and an engaging portion 25 formed on the leading end side of the base end portion 24 and engageable with the protrusion 12Ab1 of the valve cage 12.

The base end portion 24 includes an opposing wall portion 24a opposed to the crossing face 12Aa (mainly the tapered face 12Aa2 and the leading end face 12Aa3) of the valve cage side accommodating portion 12A and a bent wall portion 24b bent in the pipe axis direction X from the opposing wall portion 24a. The engaging portion 25 is formed at the leading end of the bent wall portion 24b and includes a concave groove portion 25a. In this concave wall portion 25a, there is formed an opposing inclined face 25a1 opposed to the inclined face 12Ab2 of the protrusion 12Ab1 (see FIG. 4). Though details thereof will be described later, when the pair of split members Ba are moved from the radially outer side to the radially inner side to be attached to the valve cage 12, the opposing inclined face 25a1 comes into contact with the inclined face 12Ab2 of the protrusion 12Ab1, whereby the split members Ba are guided.

Figure 10:
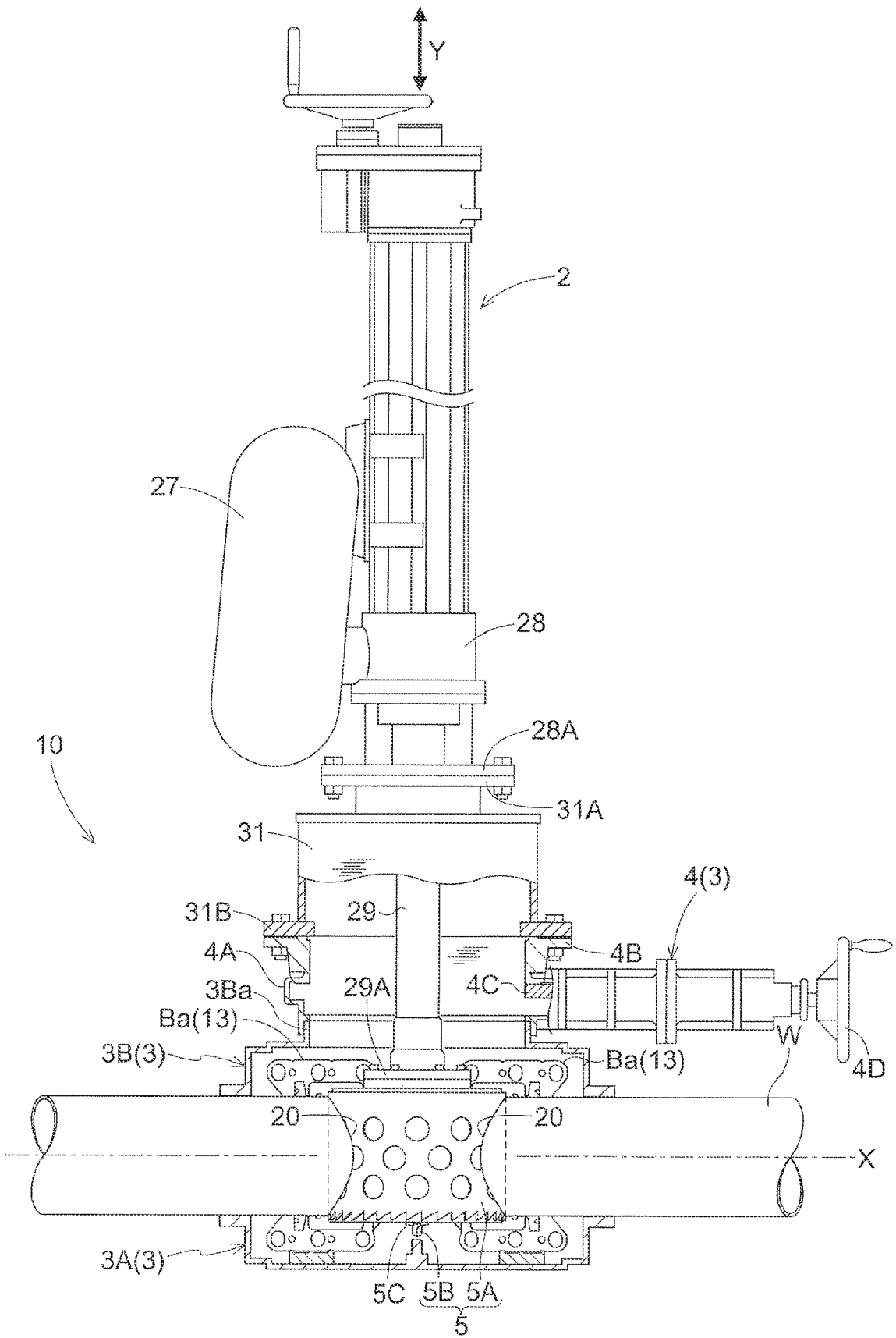
FIG. 10 is a conception diagram illustrating a fluid pipe cutting step.
Figure 11:
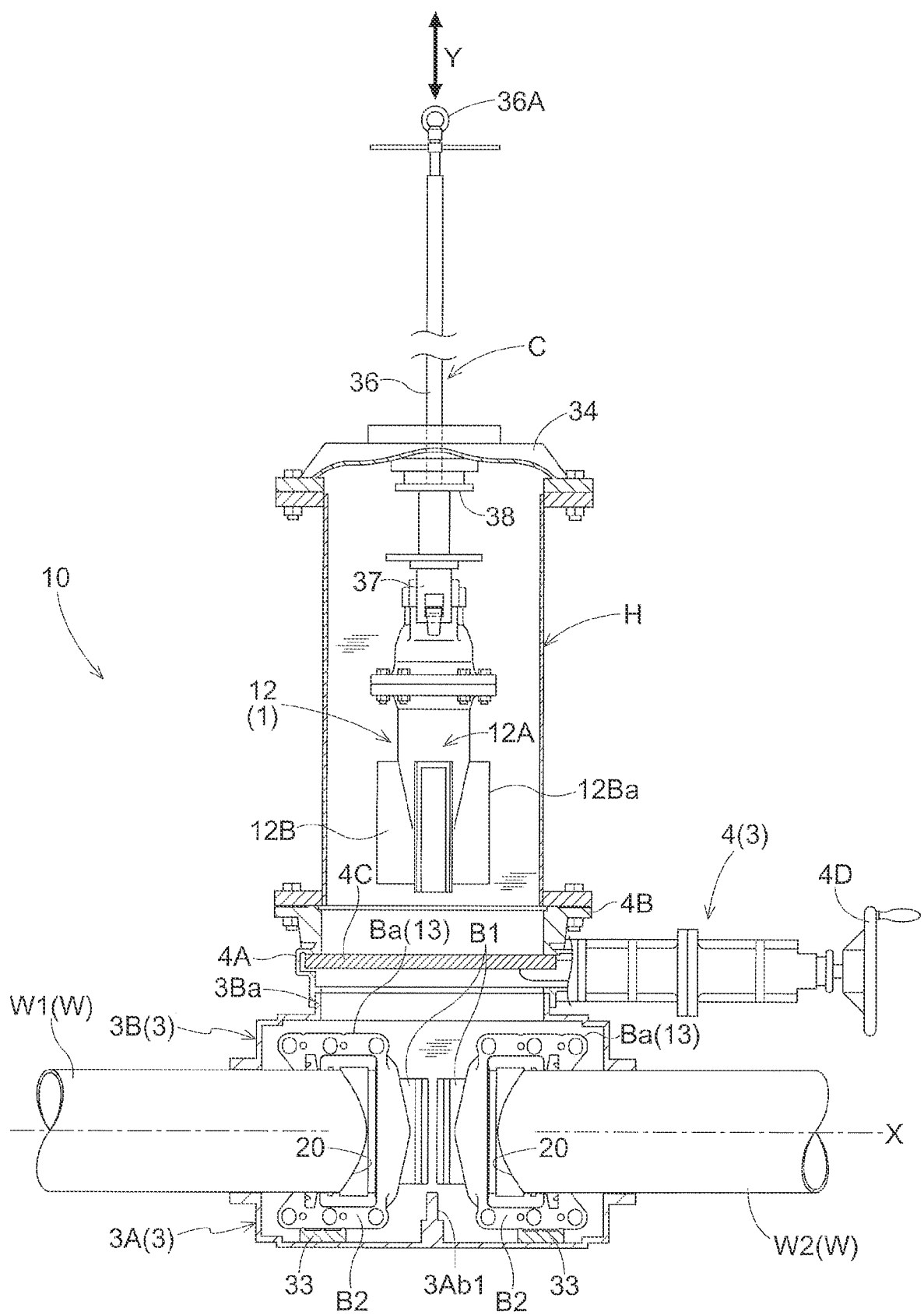
FIG. 11 is a conception diagram illustrating a valve cage installing step.

Next, there will be described a gate valve installing device 10 for use in an installing method of installing the gate valve 1. As shown in FIGS. 10-11, the gate valve installing device 10 includes the gate valve 1 described above, a cutter device 2 for cutting the water pipe W, the housing 3 which covers the water pipe W with a work valve 4 being connected thereto, and a lifter device C capable of lowering the valve cage 12 accommodating the valve body 15 therein.

As shown in FIG. 10, the cutter device 2 includes a motor section 27 constituted of an electric motor, an engine, etc., a coupling case 31 to be coupled with the work valve 4, a casing 28 to which the coupling case 31 is coupled, a driving rotational shaft 29 rotatably driven by the motor section 27, and a hole saw 5 coupled to a coupling flange portion 29A of the driving rotational shaft 29 and replaceable with another type. To a lower side coupling flange portion 28A of the casing 28, an upper side coupling flange portion 31A of the coupling case 31 capable of accommodating a part of the hole saw 5 is fixedly coupled with a fastener member such as a bolt, a nut, etc. The hole saw 5 has a larger diameter than the diameter of the water pipe W. This hole saw 5 is constituted of a cylindrical body 5A having a cutting tip at the leading end thereof and a center drill 5B protruding forwardly beyond the cutting tip through the center position of the cylindrical body 5A. Further, in the center drill 5B, there are provided a pair of retaining pieces 5C which can be pivotally raised to prevent inadvertent withdrawal of a cut removed pipe portion which has entered the inside of the cylindrical body 5A. The cutter device 2 is configured such that a driving rotational force and a feeding force are applied to the driving rotational shaft 29 with driving of the motor section 27, whereby the hole saw 5 coupled to the driving rotational shaft 29 is sent in through the work valve 4 which has been opened, while being rotated in a perpendicular direction (inserting/withdrawing direction Y) perpendicular to the pipe axis direction X, thus cutting the water pipe W into cylindrical shape. With this, as shown in FIG. 11, in the water pipe W, there are formed the pair of arc-shaped cut faces 20 which have an arc shape as seen in the side view which approach each other as they extend to the intermediate position in the side view of the water pipe W relative to the inserting/withdrawing direction Y of the valve body 15.

The housing 3 includes the lower case 3A having a halved shape to be fitted on from the lower side, the upper case 3B having a halved shape to be fitted on the water pipe W from the upper side, and the work valve 4 coupled to the upper case 3B. The two cases 3A, 3B are flange-joined to each other under a sealed state and freely attachable and detachable to/from each other via nuts or the like, and at a coupling cylindrical portion 3Ba formed integrally at the center portion of the upper case 3B in the pipe axis direction, there is attached under a sealed state a valve case 4A of the work valve 4 with a fastener member such as a nut, etc. In the valve case 4A of the work valve 4, there are provided a work valve body 4C movable to be opened and closed along the horizontal direction and an operational handle 4D for opening and closing the work valve body 4C. At the upper end of the work valve 4, there is integrally formed an upper side flange coupling portion 4B to be detachably and fixedly coupled to the lower side coupling flange portion 31B of the above-described coupling case 31 with fastener members such as a bolt, a nut, etc.

Figure 9:
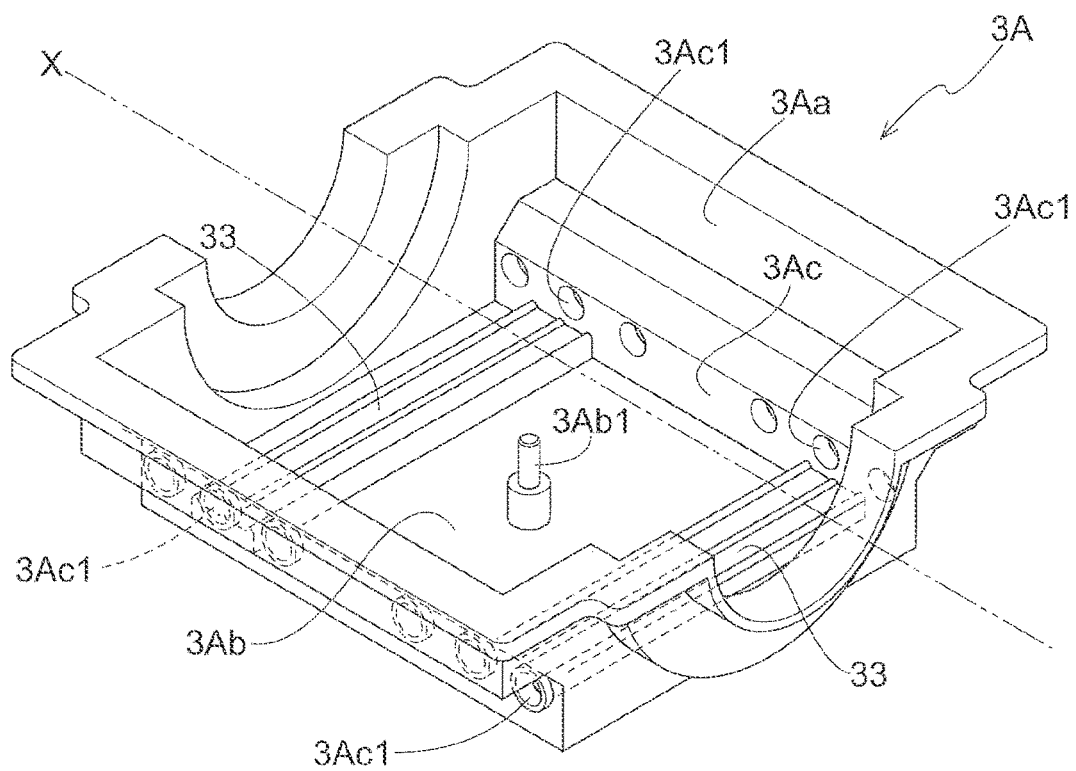
FIG. 9 is a perspective view of a lower case of a housing.

As shown in FIG. 9, the lower case 3A is provided in the form of an upper-side opened box having side walls 3Aa and a bottom wall 3Ab. Between the pair of side walls 3Aa and the bottom wall 3Ab in the longitudinal direction (along the pipe axis direction X), there are formed a pair of stepped portions 3Ac bent inwards. When the housing 3 is to be attached to the water pipe W under the sealed state, to the stepped portions 3Ac, the main body portion B1 of the split member Ba is supported (see FIG. 13). In the lateral face of the stepped portions 3Ac, there are formed a plurality of (six in this embodiment) through hole portions 3Ac1 in which pusher members P (an example of an "operating portion") capable pushing the split member Ba to the inner side (the direction of the water pipe W) are to be inserted.

Figure 12:
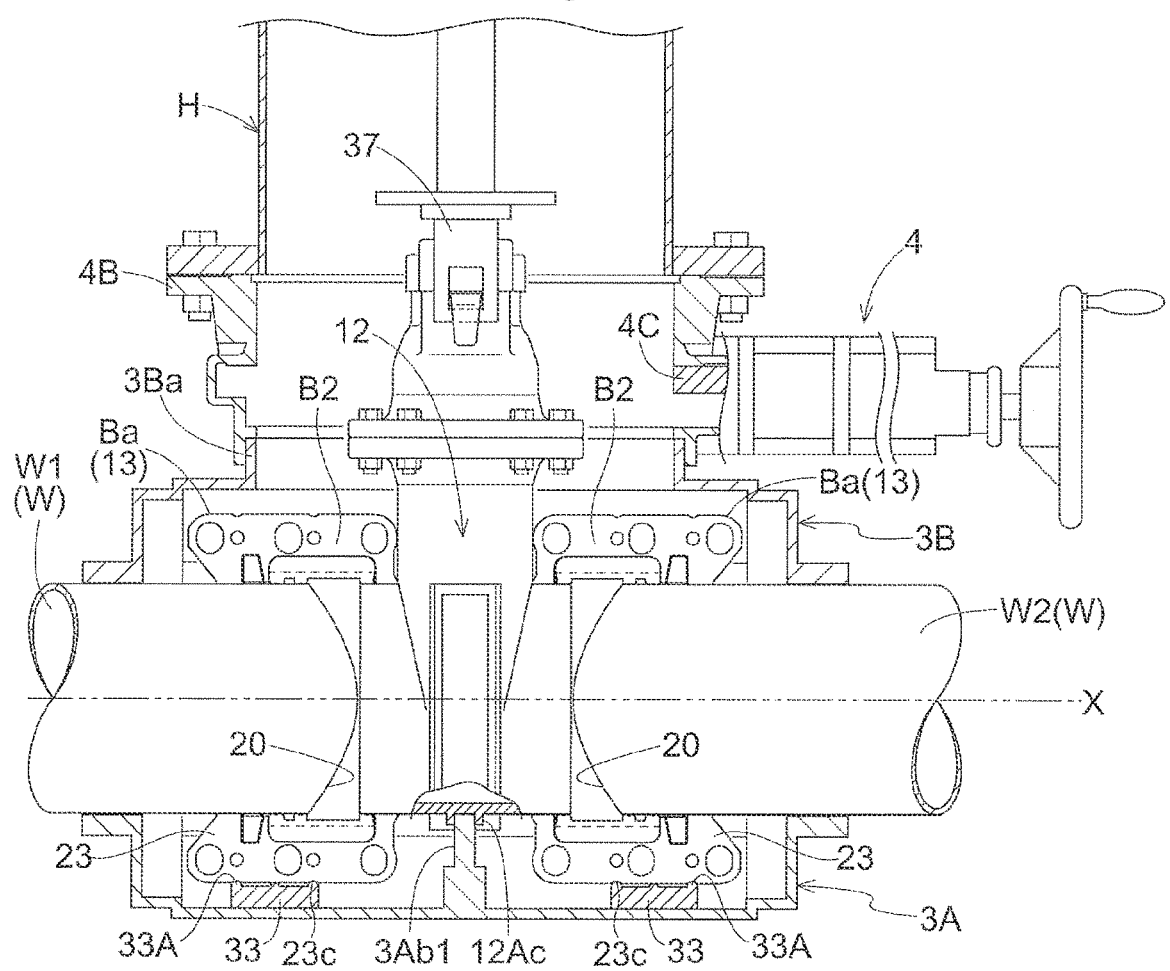
FIG. 12 is a section view illustrating the valve cage installing step.

To the bottom wall 3Ab, holding portions 33 holding the joining portions 23 of the split member Ba are fixed by adhesion, threading, fitting-in, etc., (see FIG. 12). This holding portion 33 is provided in the region between the pair of stepped portions 3Ac along the radial direction so as to allow the split member Ba to be disposed at a predetermined position between the water pipe W and the valve cage 12. At a center portion of the upper face of the holding portion 33, a plurality of (two in this embodiment) protrusions 33A engageable with engaging grooves 23c formed in the outer lateral face of the joining portion 23 are provided in the region sandwiched between the pair of stepped portions 3Ac along the radial direction. With these engaging grooves 23c and protrusions 33A, the split members Ba are fixed at predetermined positions, thus constituting a guiding mechanism for guiding sliding movements of the split members Ba from the lateral sides of the water pipe W by the pusher members P. Further, as shown in FIG. 9 and FIG. 12, in the bottom wall 3Ab, there are integrally formed as protrusions a pair of positioning pins 3Ab1 which are to be inserted into the bottom face concave portion 12Ac formed in the bottom face of the valve cage side accommodating portion 12A. When the valve cage 12 is to be disposed between the pair of water pipes W1, W2 inside the housing 3, the positioning pins 3Ab1 are inserted into the bottom face concave portion 12Ac, thereby to fix the relative position between the valve cage 12 and the housing 3.

As shown in FIG. 11, the lifter device C includes an upper housing H coupled to the work valve 4 under a sealed state, a lift operational shaft 36 supported to a lid body 34 of the upper housing H and having a coupling portion 36A to a lift driving unit such as a lane, a winch, etc., a suspension tool 37 connected to the lift operational shaft 36 and detachably supporting and suspending the valve cage 12, and a flange portion 38 configured to convey the valve cage 12 together with the upper housing H in suspension, through contact with the inner face of the lid body 34.

Figure 13:
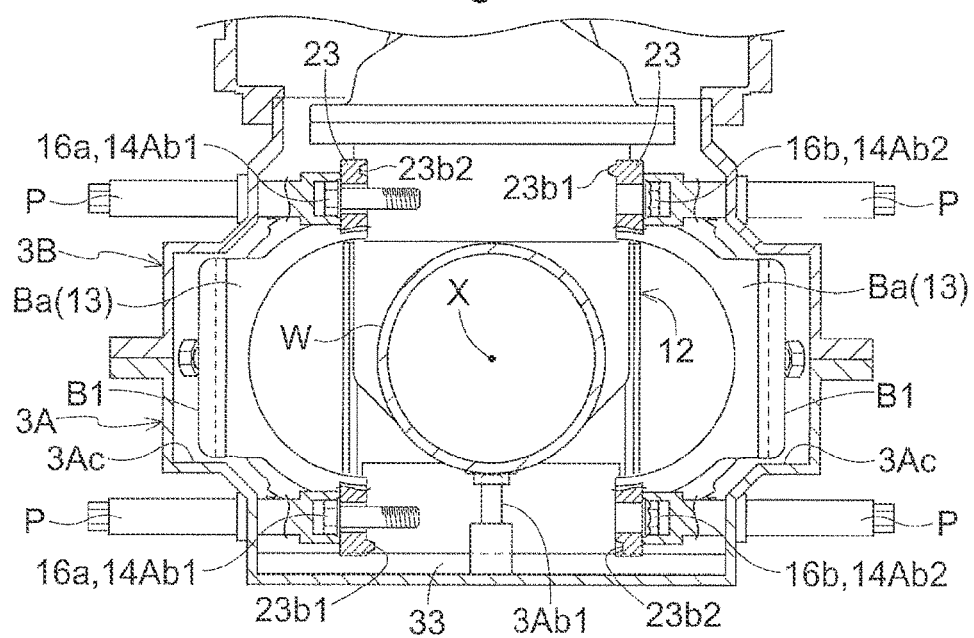
FIG. 13 is a conception diagram illustrating a sealing band attaching step.

Next, there will be explained a method of installing the gate valve 1. Firstly, as shown in FIGS. 12-13, the main body portion B1 of the split member Ba is brought into contact with the stepped portion 3Ac of the lower case 3A and also engagement is established between the engaging grooves 23c of the main body portion B1 and the protrusions 33A of the holding portion 33. In this way, the plurality of split members Ba (two sets of the pair of split members Ba in this embodiment) are mounted on the holding portion 33.

Next, to the water pipe W, the lower case 3A, the upper case 3B and the work valve 4 are attached and the plurality of split members Ba are accommodated inside the housing 3. Namely, as shown in FIG. 10, the housing 3 (the lower case 3A) accommodating the sealing band 13 (the plurality of split members Ba) therein is attached to the water pipe W under a sealed state (housing attaching step). Next, the cutter device 2 is attached to the housing 3 under a sealed state; then, with the work valve 4 being opened, the hole saw 5 is rotated inside the housing 3 to cut the water pipe W (fluid pipe cutting step). As a result, there are formed a pair of arc-shaped cut faces 20 which have an arc-shape as seen in the side view and which approach each other as extending toward the intermediate position of the water pipe W as seen in the side view relative to the inserting/withdrawing direction Y of the valve body 15.

Next, as shown in FIG. 11, the work valve 4 is closed and the cutter device 2 is removed together with the cut removed pipe portion of the water pipe W and the lifter device C is attached to the housing 3 under a sealed state. Then, the work valve 4 is opened and by using the lifter device C, the valve cage 12 accommodating the valve body 15 between the pair of arc-shaped cut faces 20 is inserted inside the housing 3 (valve cage installing step). In the course of this, since the bottom face concave portion 12Ac for positioning is formed in the bottom face of the valve cage 12, the attaching position of the valve cage 12 relative to the water pipe W is rendered accurate (see FIG. 12). Next, as shown in FIG. 13, the pusher members P provided outside the housing 3 are pushed in to cause the split members Ba to slide from the lateral sides of the water pipe W (sealing band attaching step). In this, as the engaging grooves 23c of the main body portion B1 are engaged with the protrusions 33A of the holding portion 33, the split members Ba can be guided to the predetermined positions in an accurate manner (see FIG. 12).

Then, engagement is established between the convex portions 23b1 and the concave portions 23b2 of the joining portions 23 of the pair of split members Ba which have been moved to the predetermined positions between the water pipe W and the valve cage 12, and then the pusher members P are rotatably operated, whereby the pair of joining portions 23 are fastened to each other with the fastener bolts 16a, the fastener nuts 16b, the coupling bolts 14Ab1 and the coupling nuts 14Ab2. As a result, between the water pipe W and the valve cage 12, sealed coverage is formed by the sealing band 13 (sealing band attaching step, see FIGS. 1 and 2 also). Next, the housing 3 and the lifter device C are removed from the water pipe W (housing removing step). And, as shown in FIG. 1, as pushing bolts 14Ab3 of the movement preventing mechanism 14 are fastened, the retaining members 14B are caused to bite into the outer circumferential face of the water pipe W, thus preventing movement of the annular split body B in the pipe axis direction X, whereby the gate valve 1 is completed.

In the above-described embodiment, the gate valve 1 is constituted of the valve body 15, the valve cage 12 and the sealing band 13 which covers between the water pipe W and the valve cage 12 under a sealed state. Therefore, the gate valve 1 can be formed compact, without leaving the housing 3, etc. remaining thereon. Further, as shown in FIGS. 1-4, the annular split body B provided in this embodiment is constituted of a plurality of split members Ba split in the circumferential direction of the water pipe W and includes the engaging portion 25 engageable with the protrusion 12Ab1 of the valve cage 12. Namely, since it becomes possible to attach the plurality of split members Ba from the radial direction of the water pipe W so as to engage the protrusion 12Ab1 with the engaging portion 25, there is no need to move the sealing band 13 along the pipe axis direction X. Consequently, no damage of the sealing member S attached to the inner circumferential face of the split members Ba by burrs or the like formed in the outer circumferential face of the water pipe W will occur, so that the durability of the sealing band 13 can be enhanced.

Moreover, if the inclined face 12Ab2 is provided in the protrusion 12Ab1 of the valve cage 12 and the opposing inclined face 25a1 is provided in the engaging portion 25 of the annular split body B as shown in FIG. 7, attachment of the annular split body B to the valve cage 12 is guided by the inclined face 12Ab2 and the opposing inclined face 25a1. As a result, the work of attaching the annular split body B to the valve cage 12 is facilitated.

Next, other embodiments will be explained. Incidentally, as to members same or similar as/to those of the first embodiment, explanation will be made with using the same or similar signs or names for the sake of easier understanding of the illustrations.

Second Embodiment

Figure 14:
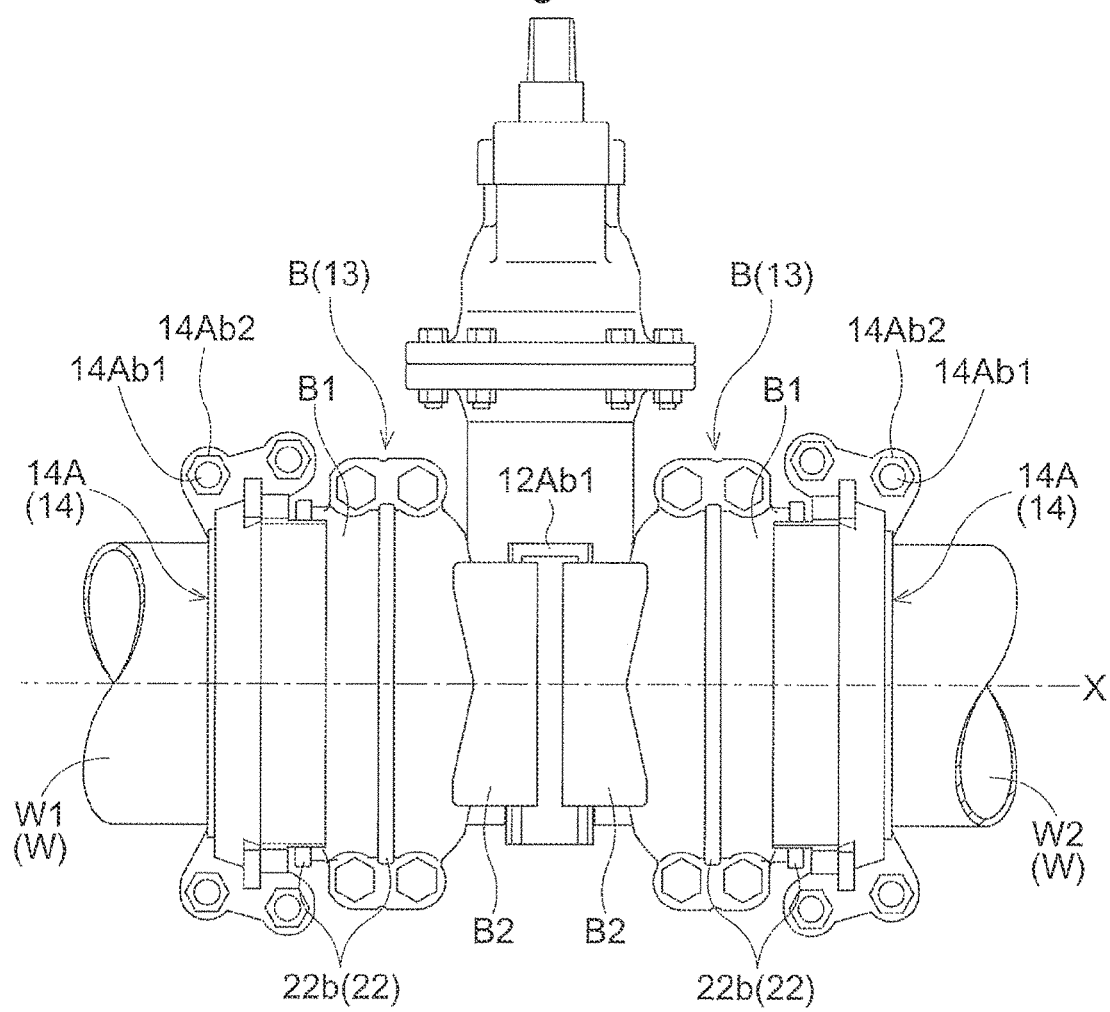
FIG. 14 is a side view showing a gate valve relating to a second embodiment.
Figure 15:
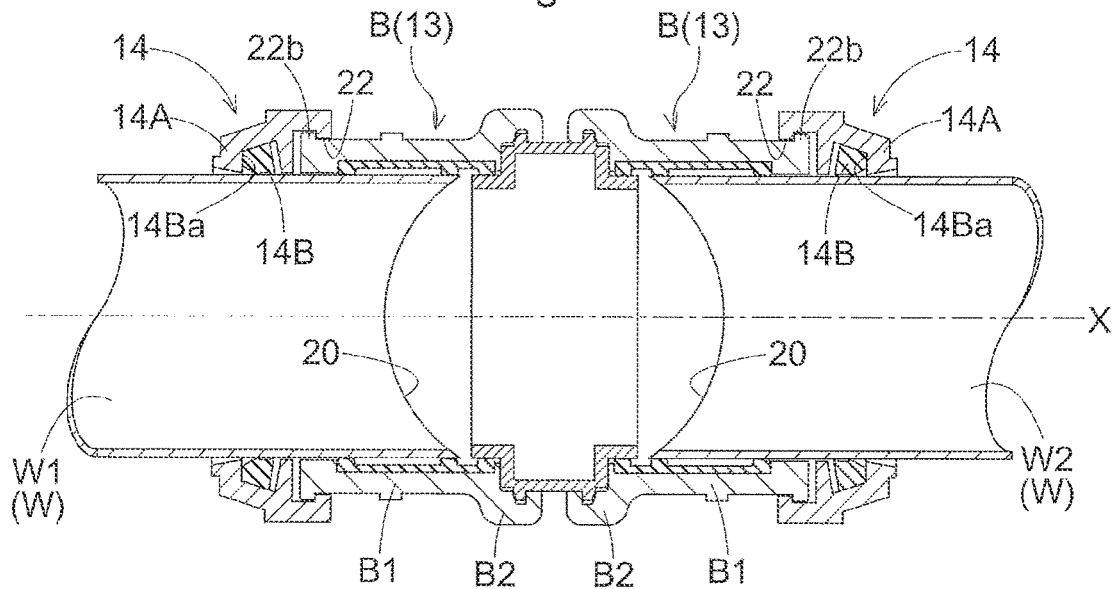
FIG. 15 is a section view showing the gate valve relating to the second embodiment.

As shown in FIG. 14 and FIG. 15, in the outer face of the annular portion 22, there are formed a pair of annular side walls 22b opposed to each other along the pipe axis direction X. Of the pair of annular side walls 22b formed in the outer face of the annular portion 22, the annular side wall 22b opposite to the extension portion B2 is retained by the movement preventing mechanism 14. Namely, in the first embodiment, the movement preventing mechanism 14 is formed integrally in the annular split body B. Whereas, this embodiment differs therefrom in that the movement preventing mechanism 14 is constituted of a separate member.

Figure 16:
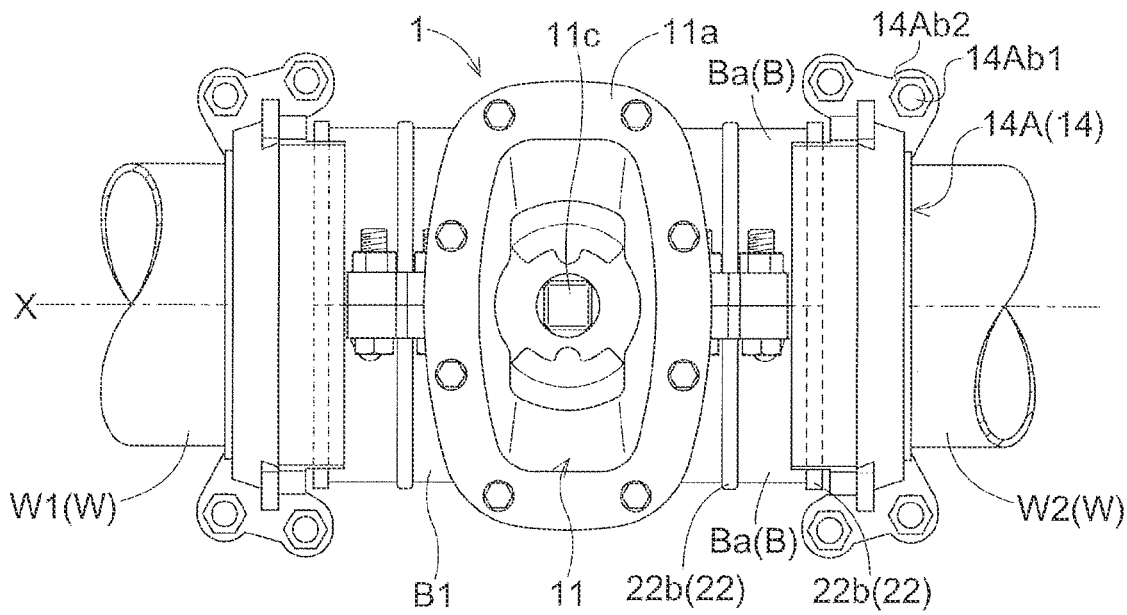
FIG. 16 is a plan view showing a gate valve relating to a variant of the second embodiment.

The movement preventing mechanism 14 is attached to the side opposite to the valve cage 12 of the annular split body B and prevents movement of the annular split body B in the pipe axis direction X. This movement preventing mechanism 14 includes a pair of split pressing bodies 14A in the form of split halves having retaining portions 14Aa detachably attachable to the annular side wall 22b opposite to the extension portion B2 of the valve cage 12 from the radially outer direction and a plurality of retaining members 14B capable of biting into the outer circumferential face of the water pipe W. The retaining members 14B are fitted in concave accommodating portions 14Ba formed at a plurality of circumferential positions in the inner circumferential face of the split pressing body 14A to be movable to the radially inner side. This retaining member 14B is configured such that by a diameter reducing pivotal motion of the pair of pressing bodies 14A in association with a fastening operation of the coupling bolt 14Ab1 and the fastening nut 14Ab2, each retaining member 14B moves to the radially inner side to bite into the outer circumferential face of the water pipe W. The rest of the configuration is identical to the first embodiment, so explanation thereof will be omitted. Incidentally, as another example of attachment of the movement preventing mechanism 14, as illustrated in FIG. 16, it is preferred that the movement preventing mechanism 14 shown in FIG. 14 be rotated by 90 degrees and this movement preventing mechanism 14 be attached between/across the split faces of the pair of split members Ba of the annular split body B. With this arrangement, the movement preventing mechanism 14 pulls the pair of split members Ba uniformly, so the detachment preventive force between the annular split body B and the movement preventing mechanism 14 can be increased advantageously.

Third Embodiment

Figure 17:
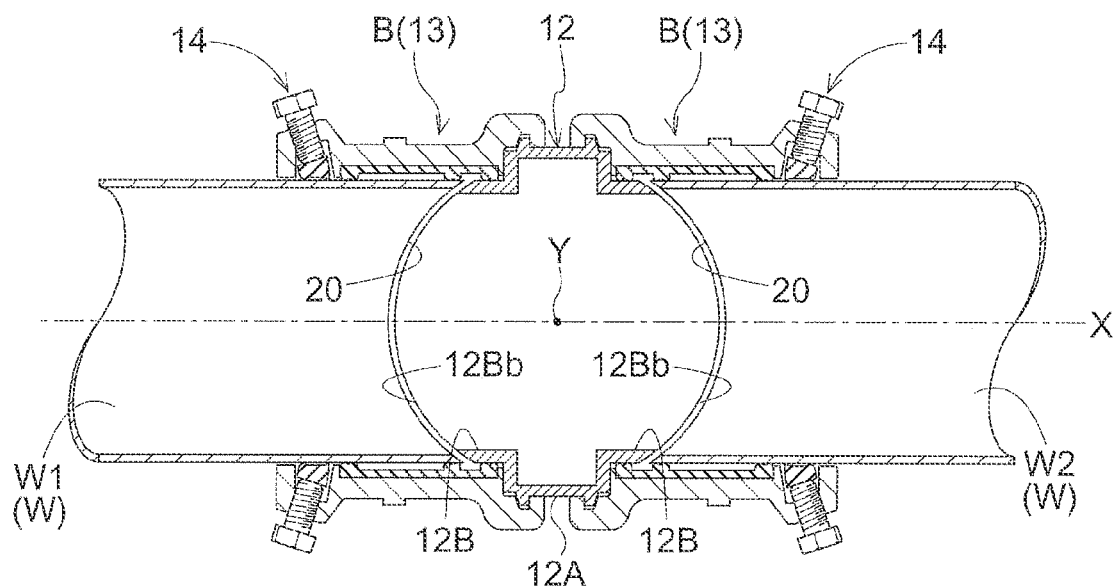
FIG. 17 is a section view showing a gate valve relating to a third embodiment.
Figure 18:
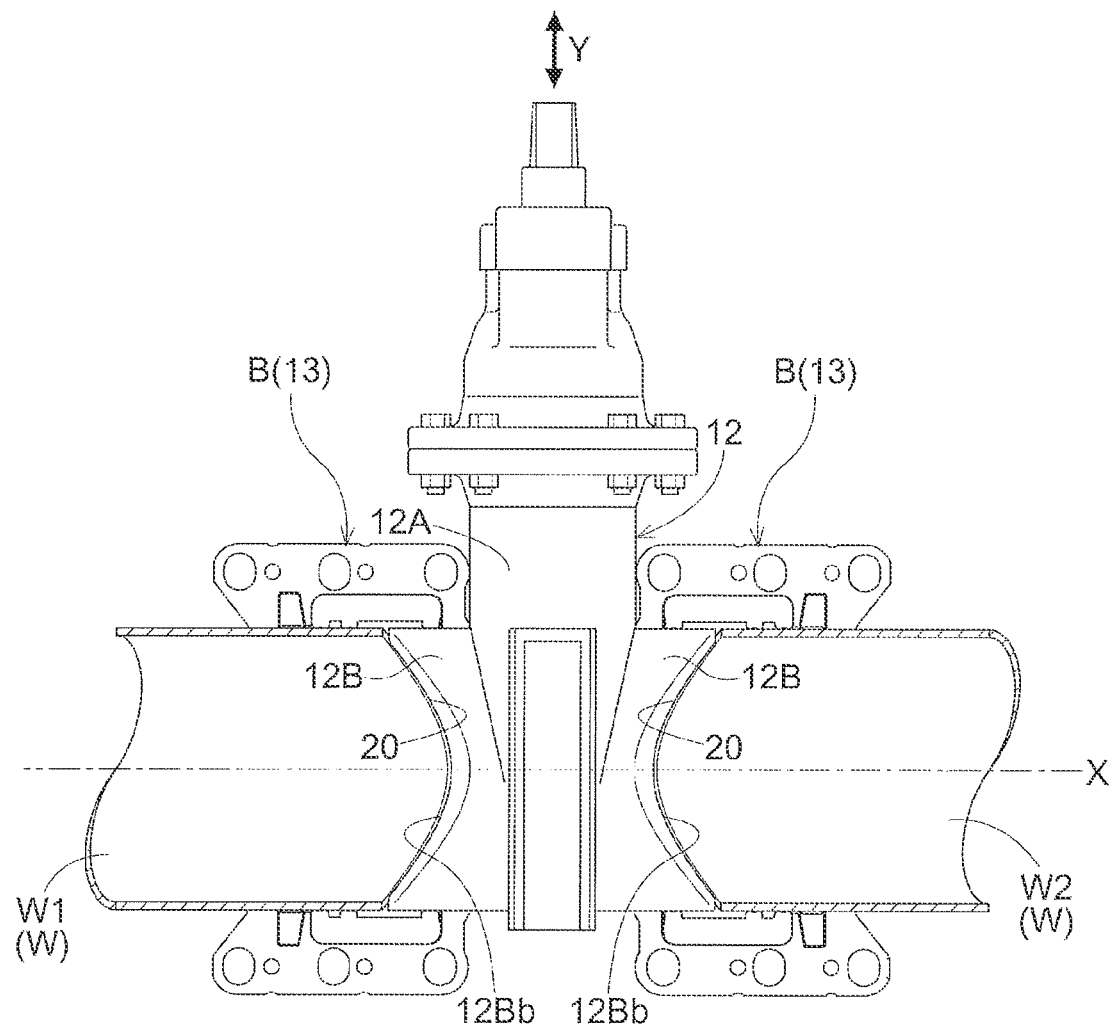
FIG. 18 is a side view showing a state in which one split member has been removed relating to the third embodiment.

As shown in FIG. 17 and FIG. 18, at opposed ends of the valve cage 12, there are formed a pair of arc-shaped end faces 12Bb opposed to each other along the arc-shaped cut faces 20 of the pair of water pipes W1, W2. And, the pair of arc-shaped end faces 12Bb in this embodiment are provided in the form of arc-shape as seen in the side view which approach each other as extending to an intermediate position as seen in the side view of the water pipe W relative to the inserting/withdrawing direction Y of the valve body 15. In this way, with provision of the arc-shaped end faces 12Bb in the protruding tubular portion 12B of the valve cage 12 in opposition to the arc-shaped cut faces 20 of the water pipe W, it becomes possible to place the protruding tubular portion 12B in close vicinity of the arc-shaped cut faces 20, so compactization of the gate valve 1 is made possible. Moreover, as water flowing in the water pipe W is guided smoothly by the protruding tubular portion 12B of the valve cage 12, pressure loss can be reduced.

Figure 19:
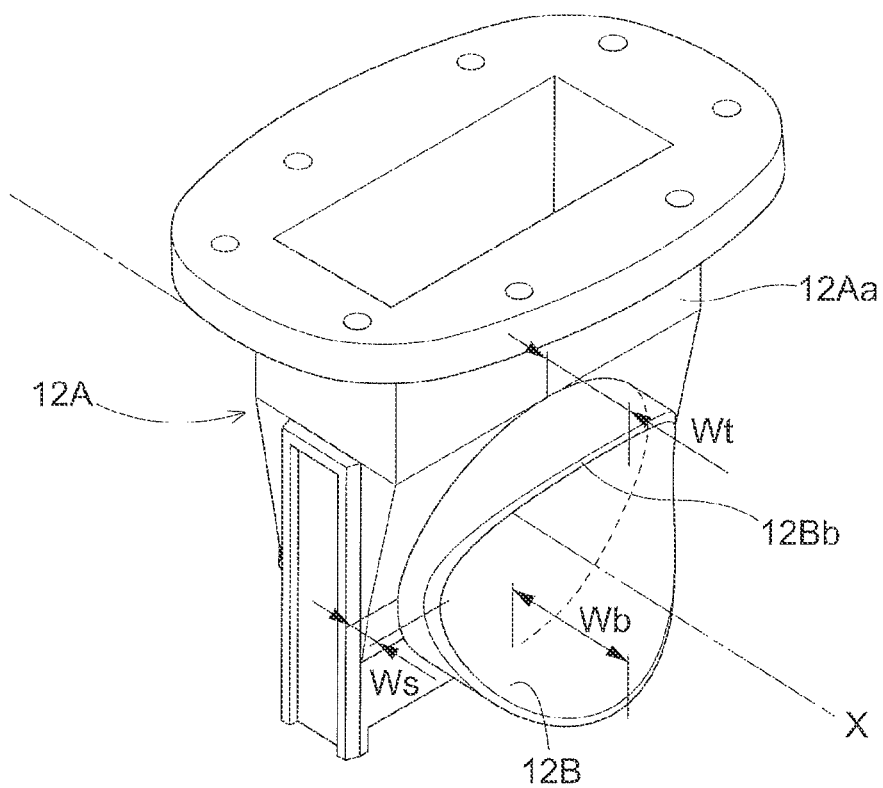
FIG. 19 is a perspective view showing a valve cage relating to the third embodiment.

As shown in FIG. 19, due to the above-described shape of the crossing face 12Aa of the valve cage side accommodating portion 12A and the above-described shape of the arc-shaped end face 12Bb of the protruding tubular portion 12B, a width Wt in the pipe axis direction X of the upper wall of the protruding tubular portion 12B is formed smaller than a width Wb in the pipe axis direction X of the lower wall, and is formed larger than a width Ws in the pipe axis direction X of the side wall.

Figure 20:
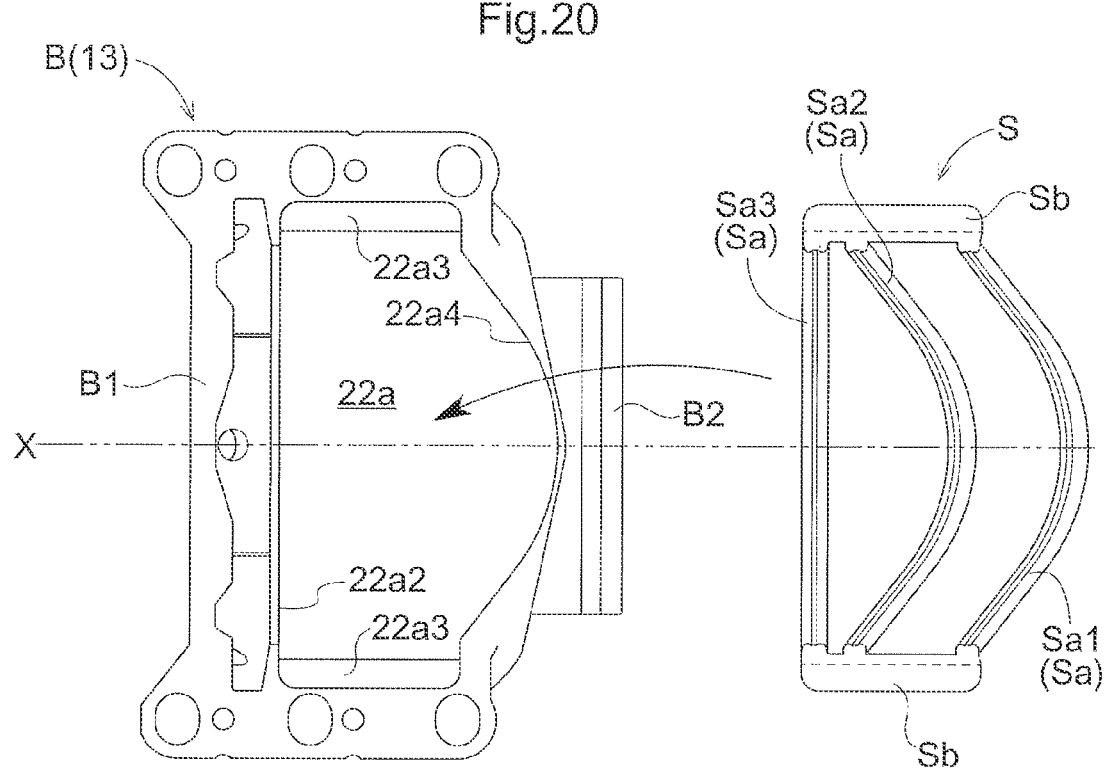
FIG. 20 is a view showing a state in which a sealing member is to be attached to one split member in the third embodiment.

As shown in FIG. 20, in the sealing groove 22a, there is formed an arc-shaped wall portion 22a4 having a side thereof opposed to the outer circumferential face of the protruding tubular portion 12B of the valve cage 12 with an intermediate portion protruding along the arc-shaped end face 22Bb and having a side thereof opposed to the water pipe W with a flat wall portion 22a2 extending perpendicular to the pipe axis direction X. Further, the first annular convex portion Sa1 of the sealing member S bulges toward the valve cage 12 side as it extends to an intermediate position as seen in the side view of the water pipe W along the arc shape as seen in the side view of the arc-shaped cut face 20 of the water pipe W. The rest of the configuration is identical to the first embodiment, so explanation thereof will be omitted.

Fourth Embodiment

Figure 21:
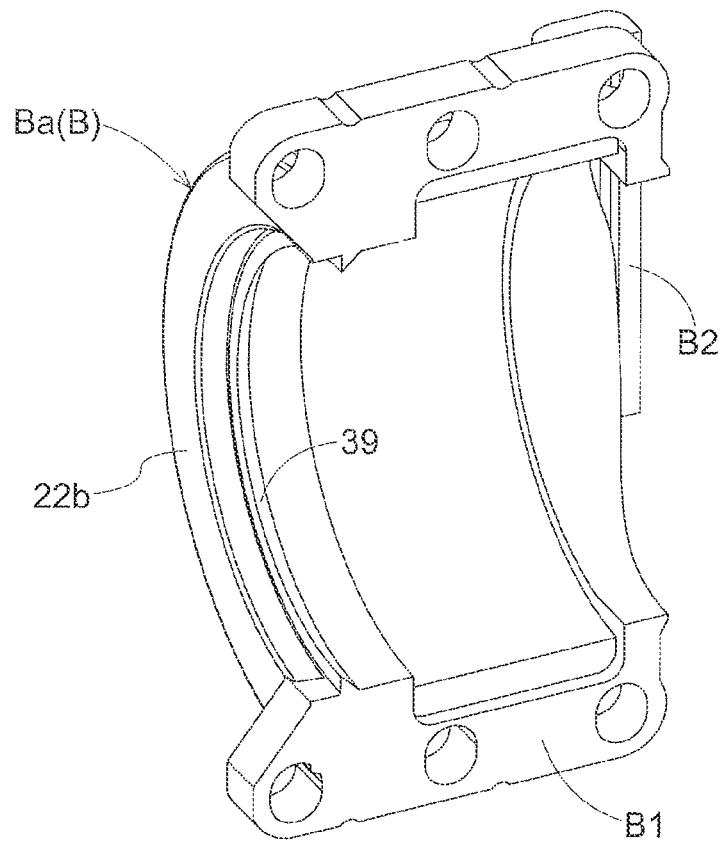
FIG. 21 is a perspective view of a sealing band relating to a fourth embodiment, as seen from the inner side thereof.

As shown in FIG. 21, in place of the movement preventing mechanism 14 provided in the above-described embodiment, in the inner circumferential face of the annular split body B (split member Ba), there may be provided an annular pawl portion 39 (an example of a "pawl portion") capable of biting into the outer circumferential face of the water pipe W. This annular pawl portion 39 is formed integrally in the inner circumferential face of the annular side wall 22b opposite to the extension portion B2 of the valve cage 12, in the main body portion B1. In the installing method of the gate valve 1 of this embodiment, the step of attaching the movement preventing mechanism 14 provided in the foregoing embodiment can be omitted. Moreover, since the arrangement requires only provision of the annular pawl portion 39 in the main body portion B1, the number of components can be reduced.

Fifth Embodiment

Figure 22:
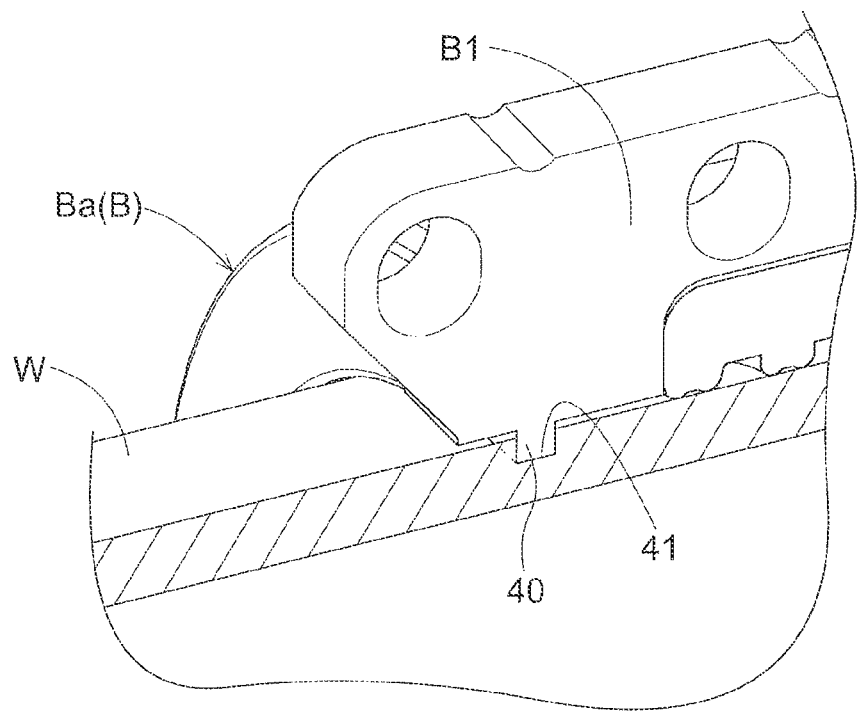
FIG. 22 is an enlarged perspective view of a gate valve relating to a fifth embodiment.

As shown in FIG. 22, in place of the movement preventing mechanism 14 provided in the above-described embodiment, in the inner circumferential face of the annular split body B (split member Ba), an annular convex portion 40 may be provided and an annular concave portion 41 may be formed in the outer circumferential face of the water pipe W, so that the annular convex portion 40 and the annular concave portion 41 may be engaged with each other. This annular convex portion 40 is formed integrally in the inner circumferential face of the annular side wall 22b opposite to the extension portion B2 of the valve cage 12. In the installing method of the gate valve 1 of this embodiment, the step of attaching the movement preventing mechanism 14 provided in the foregoing embodiment can be omitted. Moreover, since the arrangement requires only provision of the annular convex portion 40 in the main body portion B1 and the annular concave portion 41 in the outer circumferential face of the water pipe W, the number of components can be reduced.

Sixth Embodiment

Figure 23:
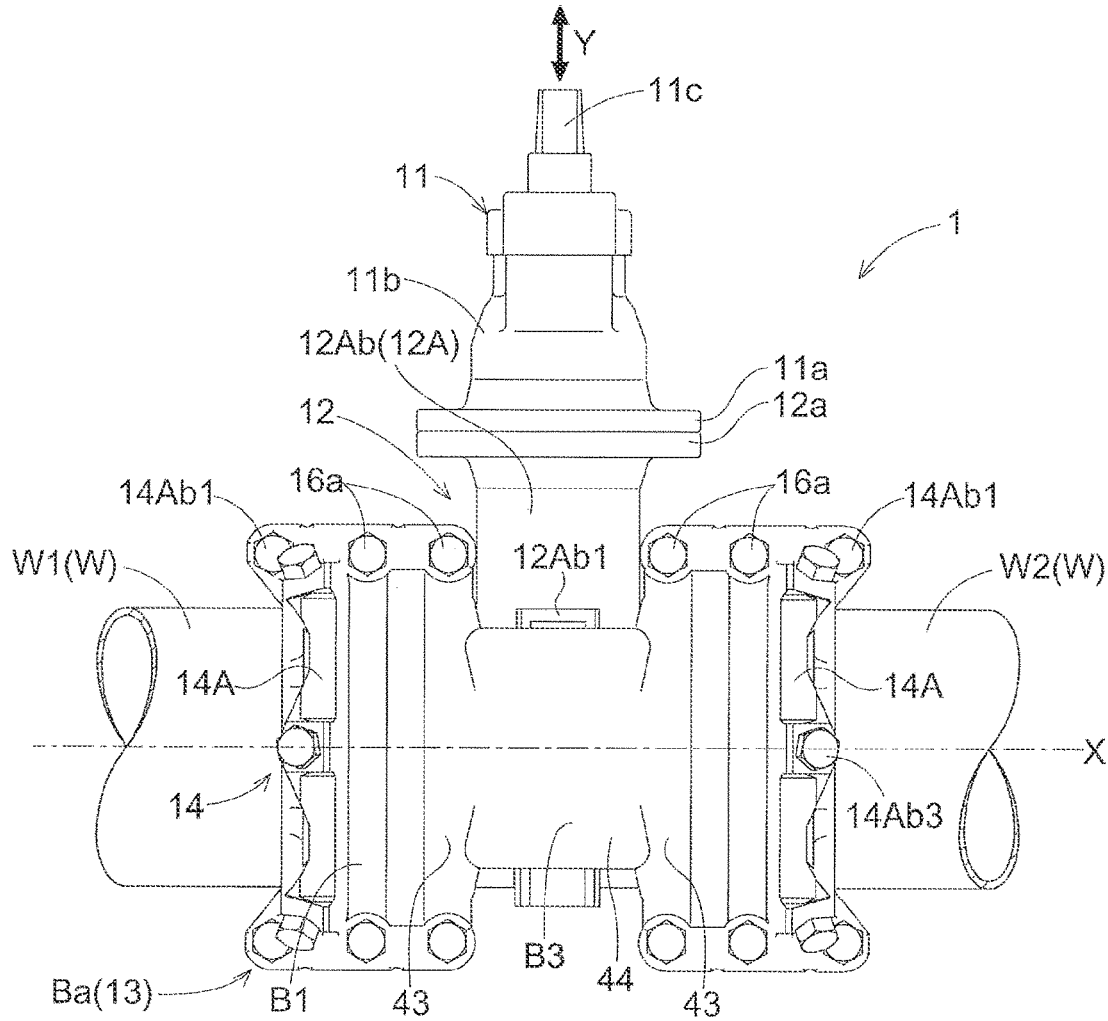
FIG. 23 is a side view of a gate valve relating to a sixth embodiment.

As shown in FIG. 23, a gate valve 1 includes a bonnet 11, a valve cage 12, a sealing band 13 and a movement preventing mechanism 14. The bonnet 11, the valve cage 12 and the movement preventing mechanism 14 are identical to those provided in the first embodiment, so explanation thereof will be omitted. Incidentally, the valve cage 12 may be configured similarly to the third embodiment and the movement preventing mechanism 14 may be configured similarly to the second embodiment, the fourth embodiment or the fifth embodiment. In these respects, the invention is not particularly limited. In this case, the annular split body B described above corresponds to a main body portion B1 which will be described later.

Figure 24:
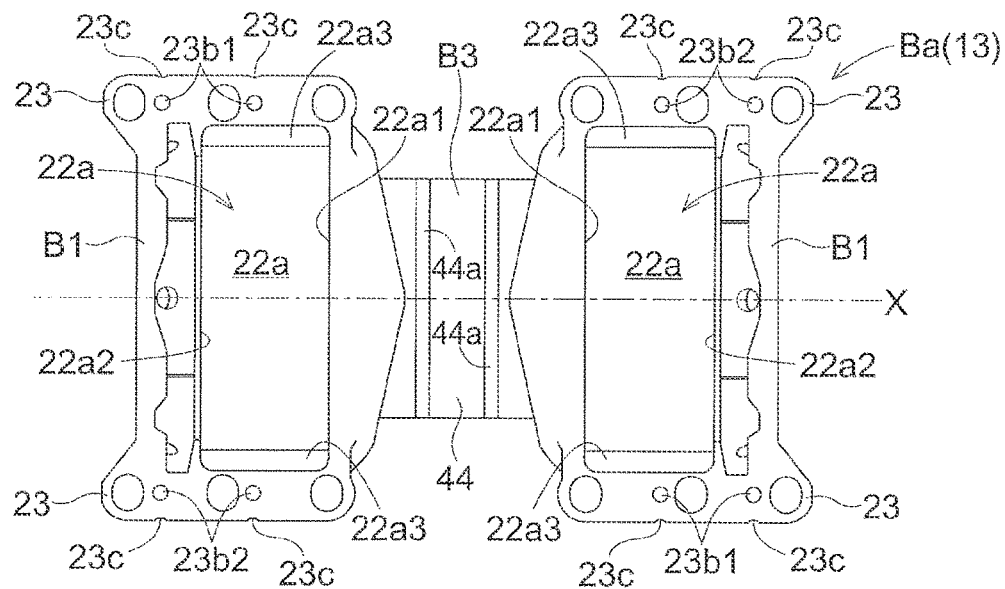
FIG. 24 is a rear view of a sealing band relating to the sixth embodiment.
Figure 25:
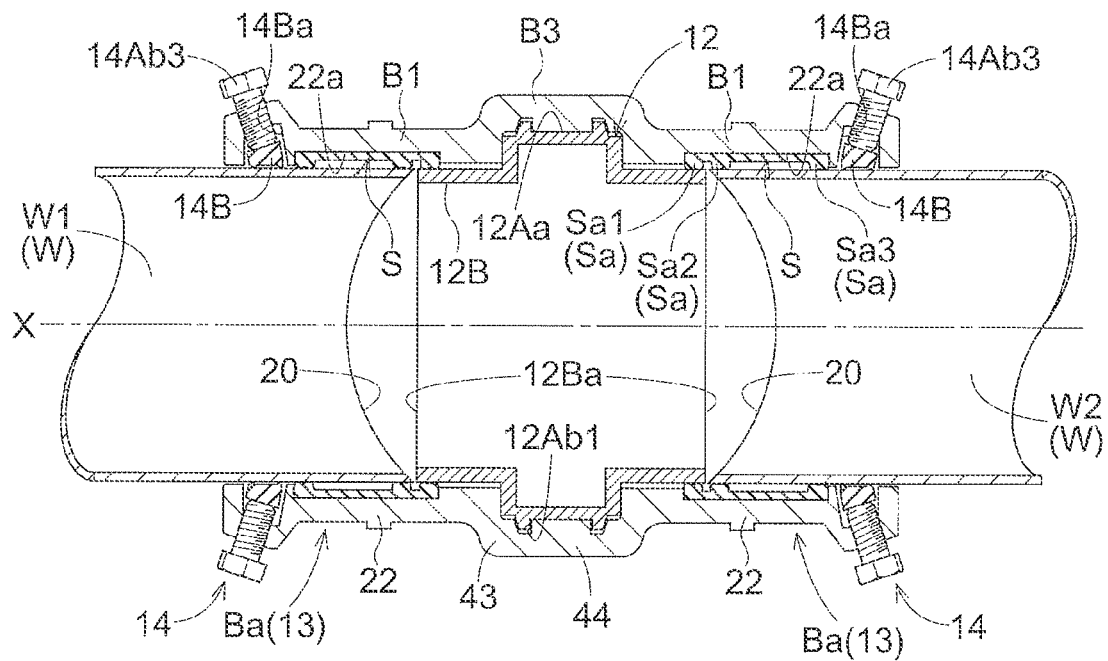
FIG. 25 is a section view of the gate valve relating to the sixth embodiment.

As shown in FIGS. 23-25, the sealing band 13 used in this embodiment is constituted of a plurality of (two in this embodiment) split members Ba split in the circumferential direction of the water pipe W and forming integrally a pair of main body portions B1 configured to cover the pair of water pipes W1, W2 respectively and the protruding tubular portions 12B of the valve cage 12 and a connecting portion B3 placed in opposition to the lateral faces 12Ab along the pipe axis direction X of the valve cage side accommodating portion 12A (an example of a valve cage body) and connecting the pair of main body portions B1 to each other.

The main body portion B1 includes an annular portion 22 and a pair of joining portions 23 protruding outwards from opposed ends of the annular potion 22 to join the pair of split members Ba via fastening bolts 16a and fastening nuts 16b. The arrangement of the main body portion B1 is identical to that of the first embodiment, so explanation thereof will be omitted.

The connecting portion B3 connects the annular portions 22 of the pair of main body portions B1 to each other and includes a bent portion 43 bent outwards from the annular portion 22 and a unifying portion 44 having an outer face extending from the bent portion 43 along the pipe axis direction X and unifying the pair of bent portions 43. In the inner face of the unifying portion 44, there are formed a plurality of (two in this embodiment) engaging concave portions 44a engageable with protrusions 12Ab1 of the valve cage 12. In this engaging concave portion 44a, there may be formed an opposing inclined face opposed to the inclined face 12Ab2 of the protrusion 12Ab1. When the pair of split members Ba are to be moved from the radially outer side to the radially inner side to be attached to the valve cage 12, with engagement between the protrusion 12Ab1 and the engaging concave portion 44a, the attaching positions of the split members Ba relative to the valve cage 12 are guided.

The sealing band 13 employed in this embodiment is of the integral type constituted of the pair of main body portions B1 and the connecting portion B3 connecting the pair of main body portions B1 to each other, so this sealing band 13 has a high strength. Moreover, since the sealing band 13 is constituted of the plurality of split members Ba split in the circumferential direction of the water pipe W, the plurality of split members Ba can be attached from the radial direction of the water pipe W, so there is no need to move the sealing band 13 along the pipe axis direction X. As a result, there is no possibility of the inner circumferential face of the sealing band 13 being damaged by a burr or the like formed in the outer circumferential face of the water pipe W, so that the durability of the sealing band 13 can be enhanced.

The installing method of the gate valve 1 of this embodiment is same as that of the first embodiment. Namely, the method includes the housing attaching step of attaching the housing 3 accommodating the sealing band 13 to the water pipe W under a sealed state, the fluid pipe cutting step of cutting the water pipe W by the cutter device 2 inside the housing 3 to form the pair of arc-shaped cut faces 20 which approach each other as extending to an intermediate position of the water pipe W with respect to the inserting/withdrawing direction Y of the valve body 15, the valve cage installing step of inserting the valve cage 12 accommodating the valve body 15 between the pair of arc-shaped cut faces 20 inside the housing 3, the sealing band attaching step of moving the split members Ba in the radial direction of the water pipe W by operating the pusher members P (an example of an "operational portion") provided outside the housing 3 so as to cover the gap between the water pipe W and the valve cage 12 under a sealed state with the sealing band 13, and the housing removing step of removing the housing 3 from the water pipe W (see FIGS. 10-13).

In this embodiment, the sealing band 13 will be accommodated in the housing 3 in advance and by operating the pusher members P provided outside the housing 3, the split members Ba will be moved to attach the sealing band 13 between the water pipe W and the valve cage 12 and then the housing 3 will be removed from the water pipe W. With this, attachment of the gate valve 1 is completed. Since the gate valve 1 is constituted of the valve cage 12 accommodating the valve body 15 and the sealing band 13 covers between the water pipe W and the valve cage 12 under a sealed state, the gate valve 1 can be formed compact, without the housing 3 remaining thereon. Moreover, since the plurality of protrusions 12Ab1 engageable with the protrusions 12Ab1 of the valve cage 12 are formed in the inner face of the unifying portion 44, the attaching position of the sealing band 13 relative to the valve cage 12 is rendered accurate.

Figure 26:
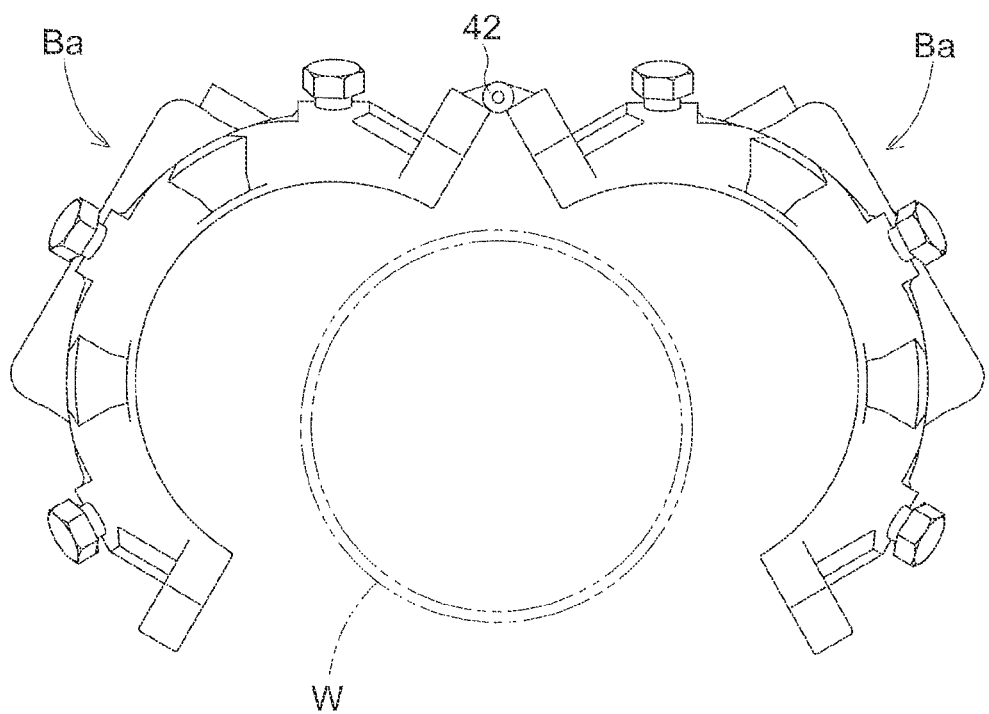
FIG. 26 is a front view of a sealing band relating to a further embodiment.

Other Embodiments (1) As shown in FIG. 26, the pair of split members Ba (semi-circular tubular members) of the annular split body B may be connected to each other via a hinge 42. In this case, with attachment of the pair of split members Ba to the protruding tubular portion 12b of the valve cage 12 in advance, the valve cage 12 will be inserted between the pair of water pipes W1, W2 and thereafter the pair of split members Ba may be closed by the pusher members P or the weights of the split members Ba.

Figure 27:
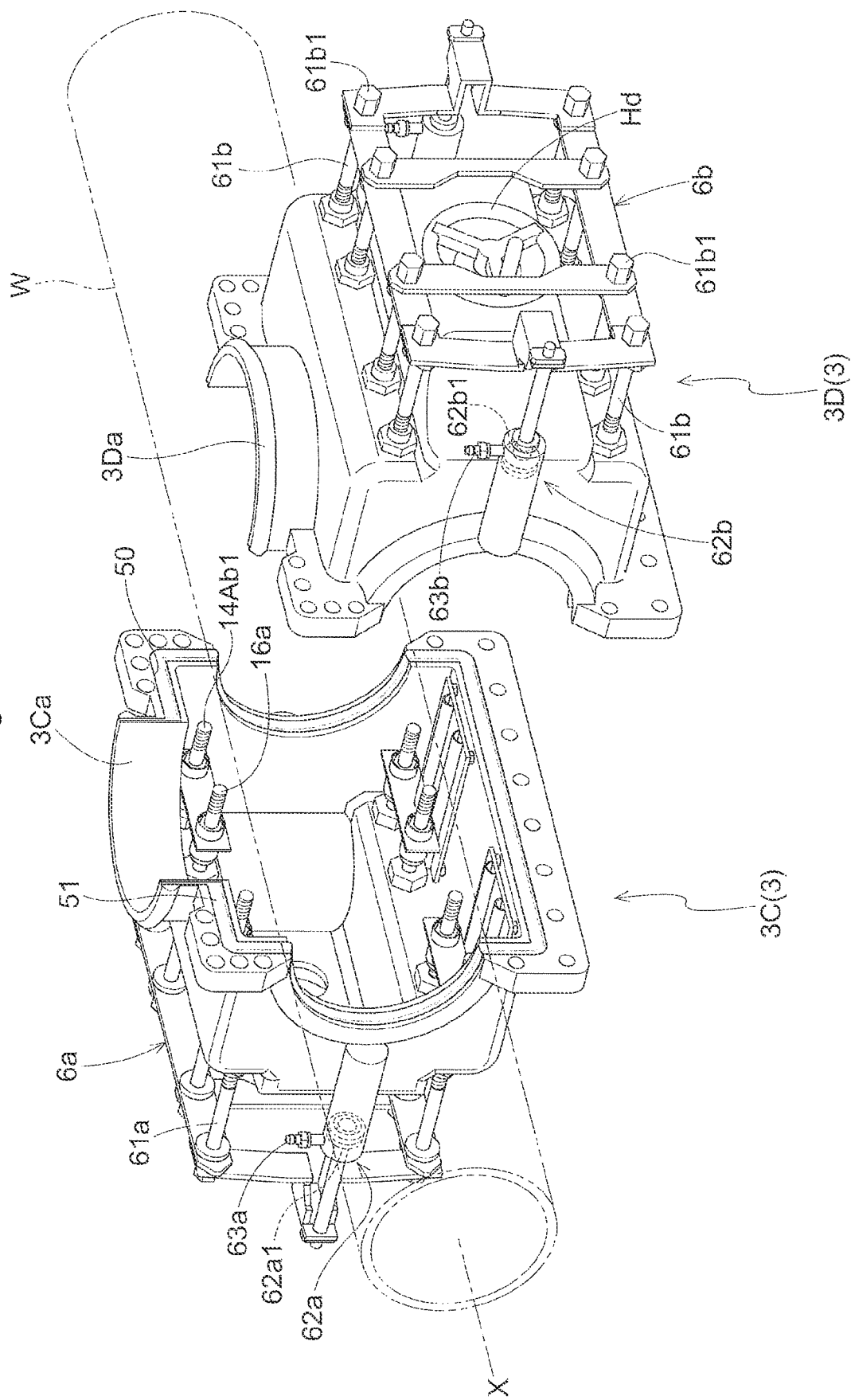
FIG. 27 is a perspective view of a housing relating to a further embodiment.

(2) In the foregoing embodiment, the housing 3 is constituted of the lower case 3A and the upper case 3B. Alternatively, as shown in FIG. 27, the housing 3 may be constituted of a first case 3C and a second case 3D in the form of halves split in the plane parallel with the vertical splitting plane of the pair of split members Ba. The two cases 3C, 3D will be detachably connected with unillustrated fastener members such as a bolt, a nut, etc. and as two sealing members 51, 51 attached to the opposed sealing grooves 50, 50 of the inner faces of the two cases 3C, 3D are placed under a mutually pressed contact and also placed in gapless contact with the outer circumferential face of the water pipe W, a sealed state is provided. Further, to two halved coupling tubular portions 3Ca, 3Da formed integrally at the center portions in the pipe axis direction X of the two cases 3C, 3D, a valve case 4A of the work valve 4 is attached under a sealed state (similarly to FIG. 10).

Figure 28:
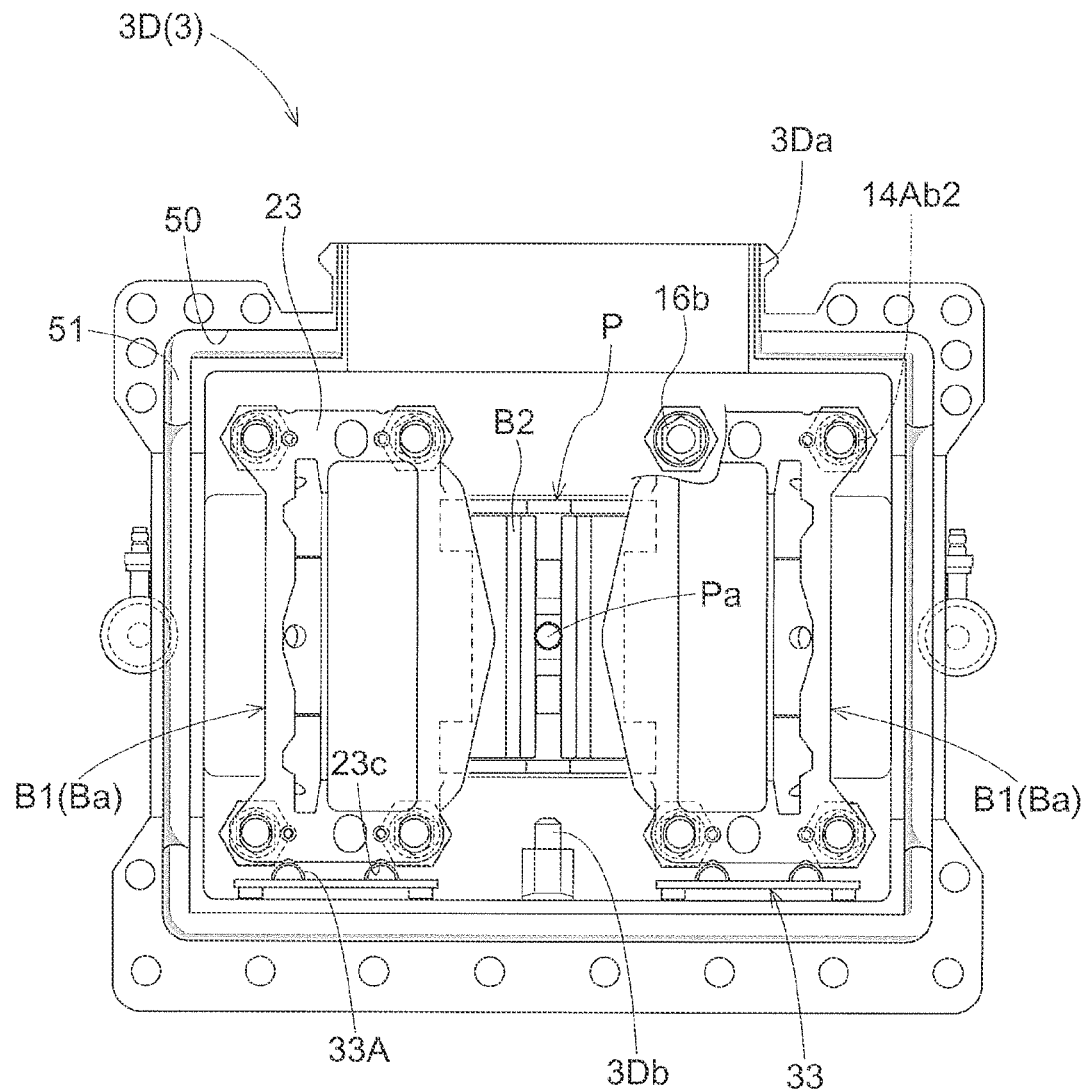
FIG. 28 is an inner side view of a second case of a housing relating to a further embodiment.

Though not shown in FIG. 27, inside the first case 3C, one split member Ba is accommodated and inside the second case 3D, the other split member Ba is accommodated. FIG. 28 illustrates a state in which the other split member Ba is accommodated inside the second case 3D, and with engagement between the engaging groove 23c of the main body portion B1 of the split member Ba and the protrusion 33A of the holding portion 33, the split member Ba is mounted to the holding portion 33 (similarly for the first case 3C). At a lower portion of this second case 3D, there is formed, as an integral protrusion therefrom, a positioning pin 3Db to be inserted into the bottom face concave portion 12Ac formed in the bottom face of the valve cage side accommodating portion 12A. Further, at the center portion of the second case 3D, there is provided a pusher member P in the form of a flat plate that can be inserted to the inner side (in the direction to the water pipe W) between the pair of extension portions B2 of the split member Ba of the first embodiment. This pusher member P is provided with a screw mechanism Pa for moving the pusher member P to the radially inner side with a rotational operation of a handle Hd from the outside of the housing 3 (similarly for the first case 3C). Incidentally, this pusher member P can be used also for the connecting portion B3 of the split member Ba in the second embodiment. In this case, in the connecting portion B3, there is formed a through hole into which a male screw bar of the screw mechanism Pa is to be inserted.

As shown in FIG. 27, the first case 3C includes a first coupling plate Ga coupling a plurality of (eight in this embodiment) bolt holding bars 61a inserted to the housing body and a first piston mechanism 62a for moving the first coupling plate Ga to the radially inner side (the direction to the water pipe W). The second case 3D includes a second coupling plate 6b coupling a plurality of (eight in this embodiment) nut operational bars 61b inserted to the housing body and a second piston mechanism 62b for moving the second coupling plate 6b to the radially inner side (the direction to the water pipe W). At the leading end of each bolt holding bar 61a, heads of the fastener bolt 16a and a coupling bolt 14Ab1 inserted to the joining portion 23 of one split member Ba are held non-rotatably. At the leading end of each nut operational bar 61b, the fastener nut 16b and the coupling nut 14Ab2 are held non-rotatably together with the nut operational bar 61b (see FIG. 28 also). The nut operational bar 61b can be rotatably operated by a tool (not shown) at an operated portion 61b1 provided at the base end thereof.

The first piston mechanism 62a and the second piston mechanism 62b include inlets 63a, 63b capable of introducing fluid present inside the housing. As the pressure of the fluid introduced through the inlets 63a, 63b act on pressure receiving faces 62a1, 62b1, the coupling plates 6a, 6b can be moved to the radially inner side and in association therewith the pair of split members Ba placed in contact with the bolt holding bars 61a and the nut operational bars 61b can also be moved at the same time to the radially inner side. In addition to these piston mechanisms 62a, 62b, in association with the movement of the pusher members P to the radially inner side by operation of the handle Hd, the pair of split members Ba will be moved closer to each other and by rotating the operated portion 61b1 with the tool, the fastener nut 16b and the coupling nut 14Ab2 will be threaded with the fastener bolt 16a and the coupling bolt 14Ab1 respectively, thereby to fasten the pair of joining portions 23 to each other (sealing band attaching step). Incidentally, the fluid for operating the piston mechanisms 62a, 62b may also be air or water which is introduced by means of a pump from the outside.

(3) In place of the sealing band 13, a telescopic member telescopic in the pipe axis direction X may be used and this telescopic member may be pressed by a known detachment preventing tool.

(4) The invention is not limited to the arrangement shown in the foregoing embodiment in which the splitting direction of the split faces of the pair of split members Ba is the vertical direction. This direction may also be the left/right direction, an oblique direction, etc. In case the direction of the split faces of the pair of split members Ba is set as the left/right direction, the attachment may be carried out such that the valve cage 12 in which the upper side split member Ba is attached to the protruding tubular portion 12B in advance may be inserted between the pair of water pipes W1, W2 and then, the lower side split member Ba may be pushed up by means of a jack mechanism provided in the bottom wall 3Ab of the lower case 3A.

(5) The gate valve 1 may be arranged such that inserting/withdrawing direction Y of the valve body 15 is not the vertical direction, but an oblique direction or the left/right direction.

(6) The fluid pipe is not limited to a water pipe, but the fluid pipe is not particularly limited if it is any pipe for flowing a fluid, such as a gas pipe.

INDUSTRIAL APPLICABILITY

The present invention is applicable to a gate valve having a valve body inserted between a pair of fluid pipes for closing a passage and a method of installing such gate pipe.

REFERENCE SIGNS LIST

1: gate valve
2: cutter device
3: housing
12: valve cage
12A: valve cage side accommodating portion (valve cage body)
12Ab: lateral face
12Ab1: protrusion (engaged portion)
12Ab2: inclined face
12Ac: bottom face concave portion
12B: protruding tubular portion
12Ba: arc-shaped end face
13: sealing band
14: movement preventing mechanism
15: valve body
20: arc-shaped cut face
25: engaging portion
33: holding portion
39: annular pawl portion (pawl portion)
40: annular convex portion
41: annular concave portion
42: hinge
B: annular split body
B1: main body portion
B3: connecting portion
Ba: split member
P: pusher member (operational portion)
S: sealing member
Sa1: first annular convex portion
Sa2: second annular convex portion
Sa3: second annular convex portion
W: water pipe (fluid pipe)
X: pipe axis direction
Y: inserting/withdrawing direction

The invention claimed is:

1. A gate valve comprising:
a valve body capable of closing a flow passage by being inserted between a pair of fluid pipes;
a valve cage disposed between the pair of fluid pipes and accommodating the valve body; and
a sealing band configured to cover between the pair of fluid pipes and the valve cage under a sealed state;
the valve cage including a pair of protruding tubular portions protruding from a body of the valve cage in a pipe axis direction of the fluid pipes; and
the sealing band including a pair of main body portions and a connecting portion connecting the pair of main body portions and formed unitarily therewith, the sealing band being constituted of a plurality of split members split in a circumferential direction of the fluid pipes, the pair of main body portions covering the respective fluid pipes and the protruding tubular portions under a sealed state, the connecting portion being opposed to a lateral face of the valve cage body extending along the pipe axis direction.

2. The gate valve of claim 1, wherein:
to an inner face of the respective main body, there is attached a sealing member extending between the fluid pipe and the protruding tubular portion; and
in the sealing member, there are formed, as protrusions therefrom, a first annular convex portion coming into contact with the outer circumferential face of the fluid pipe and a second annular convex portion coming into contact with an outer circumferential face of the protruding tubular portion.

3. The gate valve of claim 1, wherein:
end faces of the pair of fluid pipes comprise a pair of arc-shaped cut faces which approach each other as extending toward an intermediate position of the fluid pipes with respect to an inserting/withdrawing direction of the valve body; and
at the protruding tubular portions, there are formed arc-shaped end faces opposed to each other along the arc-shaped cut faces.

4. The gate valve of claim 1, wherein a positioning bottom face concave portion is formed in a bottom face of the valve cage.

5. The gate valve of claim 1, wherein each one of the plurality of split members comprises a pair of semi-cylindrical members which are joined to each other.

6. The gate valve of claim 5, wherein in split faces of the semi-cylindrical members, there are formed concave/convex profiles which are engageable with each other.

7. The gate valve of claim 1, wherein on the side of the main body portion opposite to the valve case, there is provided a movement preventing mechanism configured to prevent movement of the sealing band in the pipe axis direction.

8. The gate valve of claim 1, wherein in the inner circumferential face of the main body portion, there is formed a pawl portion which bites into the fluid pipe.

9. The gate valve of claim 1, wherein:
an annular concave portion is formed in the outer circumferential face of the fluid pipe; and
an annular convex portion engageable with the annular concave portion is formed in the inner circumferential face of the annular split body.

10. A gate valve comprising:
a valve body capable of closing a flow passage by being inserted between a pair of fluid pipes;
a valve cage disposed between the pair of fluid pipes and accommodating the valve body; and
a sealing band configured to cover between the pair of fluid pipes and the valve cage under a sealed state;
the sealing band being comprised of a pair of annular split bodies split by a plane perpendicular to a pipe axis direction in such a manner as to cover the pair of fluid pipes and opposed end portions of the valve cage opposed to end faces of the respective fluid pipes; and each annular split body including a main body portion and being constituted of a plurality of split members split in a circumferential direction of the fluid pipe, the main body portion covering the fluid pipe and the valve cage under a sealed state, wherein:

in the valve cage, there is formed a protrusion protruding from a lateral face along the pipe axis direction to the outer side;

the annular split body includes an extension portion extending from the main body portion to oppose to the lateral face; and a leading end portion of the extension portion is engaged with the protrusion.

11. The gate valve of claim 10, wherein:

in the protrusion, there is formed an inclined face whose width in the pipe axis direction progressively increases toward the lateral face; and in the leading end portion, there is formed an opposing inclined face opposed to the inclined face.

12. The gate valve of claim 10, wherein:

the valve cage includes a pair of protruding tubular portions protruding from the valve cage body in the pipe axis direction;

in an inner face of the main boy portion, there is attached a sealing member extending between the fluid pipe and the protruding tubular portion; and in the sealing member, there are formed, as protrusions therefrom, a first annular convex portion coming into contact with the outer circumferential face of the fluid pipe and a second annular convex portion coming into contact with the outer circumferential face of the protruding tubular portion.

13. The gate valve of claim 12, wherein:

the pair of end faces comprise a pair of arc-shaped cut faces which approach each other as extending toward an intermediate position of the fluid pipes with respect to an inserting/withdrawing direction of the valve body; and in the annular tubular portion, there is formed an opposing arc-shaped end face along the arc-shaped cut face.

14. The gate valve of claim 10, wherein a positioning bottom face concave portion is formed in a bottom face of the valve cage.

15. The gate valve of claim 10, wherein each one of the plurality of split members comprises a pair of semi-cylindrical members which are joined to each other.

16. The gate valve of claim 15, wherein in split faces of the semi-cylindrical members, there are formed concave/convex profiles which are engageable with each other.

17. The gate valve of claim 10, wherein on the side of the main body portion opposite to the valve case, there is provided a movement preventing mechanism configured to prevent movement of the sealing band in the pipe axis direction.

18. The gate valve of claim 10, wherein in the inner circumferential face of the main body portion, there is formed a pawl portion which bites into the fluid pipe.

19. The gate valve of claim 10, wherein:

an annular concave portion is formed in the outer circumferential face of the fluid pipe; and an annular convex portion engageable with the annular concave portion is formed in the inner circumferential face of the annular split body.

\* \* \* \* \*